US012587901B2

(12) United States Patent (10) Patent No.: US 12,587,901 B2
Sugaya et al. (45) Date of Patent: Mar. 24, 2026

(54) COMMUNICATION DEVICE AND COMMUNICATION METHOD

(71) Applicant: Sony Group Corporation, Tokyo (JP)

(72) Inventors: Shigeru Sugaya, Tokyo (JP); Ken Tanaka, Tokyo (JP); Kosuke Aio, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 96 days.

(21) Appl. No.: 18/031,642

(22) PCT Filed: Oct. 8, 2021

(86) PCT No.: PCT/JP2021/037304
§ 371 (c)(1),
(2) Date: Apr. 13, 2023

(87) PCT Pub. No.: WO2022/085486
PCT Pub. Date: Apr. 28, 2022

(65) Prior Publication Data
US 2024/0022956 A1 Jan. 18, 2024

(30) Foreign Application Priority Data
Oct. 23, 2020 (JP) ................................. 2020-178036

(51) Int. Cl.
*H04W 28/04* (2009.01)
*H04L 1/1822* (2023.01)
(Continued)

(52) U.S. Cl.
CPC ........... *H04W 28/04* (2013.01); *H04L 1/1822* (2013.01); *H04L 1/1887* (2013.01); *H04W 76/20* (2018.02)

(58) Field of Classification Search
CPC ..... H04W 28/04; H04W 28/06; H04W 28/02; H04W 76/20; H04W 76/10; H04W 76/15;
(Continued)

(56) References Cited

U.S. PATENT DOCUMENTS

2018/0159668 A1* 6/2018 Phuyal .................. H04L 1/1861
2018/0167932 A1* 6/2018 Papasakellariou .... H04L 1/1887
(Continued)

FOREIGN PATENT DOCUMENTS

CN 110199549 A * 9/2019 ........... H04B 1/0483
CN 110572244 A 12/2019
(Continued)

OTHER PUBLICATIONS

International Search Report and Written Opinion mailed on Dec. 21, 2021, received for PCT Application PCT/JP2021/037304, filed on Oct. 8, 2021, 10 pages including English Translation.
(Continued)

*Primary Examiner* — Phong La
(74) *Attorney, Agent, or Firm* — XSENSUS LLP

(57) ABSTRACT

A communication device that enables more suitable retransmission of undelivered data in communication using a plurality of links. A transmission side communication device controls parallel transmission of data using the plurality of links in a wireless network, and sets retransmission of undelivered data using available links when the undelivered data is generated on a predetermined one of links. A reception side communication device controls parallel reception of data using the plurality of links in the wireless network, sets reception acknowledgment information including information specifying the reception situation of the data in the other link when returning reception acknowledgment infor-
(Continued)

mation on one of the links, and controls the return of the reception acknowledgment information to set up links to receive retransmission data.

20 Claims, 26 Drawing Sheets

(51) Int. Cl.
*H04L 1/1867* (2023.01)
*H04W 76/20* (2018.01)

(58) Field of Classification Search
CPC .... H04W 76/19; H04W 76/25; H04L 1/1822; H04L 1/1825; H04L 1/1829; H04L 1/1864; H04L 1/1867; H04L 1/1858; H04L 1/00; H04L 1/1887; H04L 1/189; H04L 1/1896
See application file for complete search history.

(56) References Cited

U.S. PATENT DOCUMENTS

| | | | | |
|---|---|---|---|---|
| 2019/0149303 A1* | 5/2019 | Yilmaz | .................... | H04L 1/18 |
| | | | | 370/329 |
| 2019/0327736 A1* | 10/2019 | Takeda | .................. | H04W 72/23 |
| 2020/0145140 A1* | 5/2020 | Lee | ....................... | H04L 5/0055 |
| 2020/0177311 A1* | 6/2020 | Ho | ......................... | H03M 13/05 |
| 2020/0280827 A1* | 9/2020 | Fechtel | .................. | H04W 8/08 |
| 2021/0100051 A1* | 4/2021 | Ho | ........................ | H04W 12/03 |
| 2021/0211375 A1* | 7/2021 | Kwon | ................. | H04W 72/535 |
| 2021/0297343 A1* | 9/2021 | Vegesna | .................. | H04L 43/16 |
| 2021/0297351 A1* | 9/2021 | Vegesna | .................. | H04L 49/90 |
| 2023/0103403 A1* | 4/2023 | Dong | .................... | H04L 1/1854 |
| | | | | 370/329 |

FOREIGN PATENT DOCUMENTS

| | | | | | |
|---|---|---|---|---|---|
| JP | 2002-186014 A | | 6/2002 | | |
| JP | 2010-011280 A | | 1/2010 | | |
| JP | 2010-537542 A | | 12/2010 | | |
| JP | 2017-055398 A | | 3/2017 | | |
| JP | 2019025583 A | | 2/2019 | | |
| WO | WO-2014074757 A2 | * | 5/2014 | .......... | H03M 13/616 |
| WO | WO-2015176557 A1 | * | 11/2015 | ............ | H04L 47/34 |
| WO | WO-2017094331 A1 | | 6/2017 | | |
| WO | WO-2018021819 A1 | * | 2/2018 | ............ | H04L 1/004 |
| WO | 2019/009099 A1 | | 1/2019 | | |
| WO | WO-2020062820 A1 | | 4/2020 | | |
| WO | WO-2020166922 A1 | * | 8/2020 | .......... | H04L 1/1812 |
| WO | WO-2021186587 A1 | * | 9/2021 | .......... | H04L 1/0084 |
| WO | WO-2022011714 A1 | * | 1/2022 | ........ | H04W 74/0816 |

OTHER PUBLICATIONS

Chitrakar et al., "Multi-link transmission", IEEE 802.22-19/1128r0 ,Available Online At: https://mentor.ieee.org/802.11/dcn/19/11-19-1128-00-00be-multi-link-transmission.pptx, Jul. 2019, pp. 1-8.

Liwen Chu (NXP) "Minutes for TGbe Mac ad-Hoc teleconferences May and Jul. 2020", IEEE 802.11-20/0777r10, IEEE.

\* cited by examiner

Figure 13:
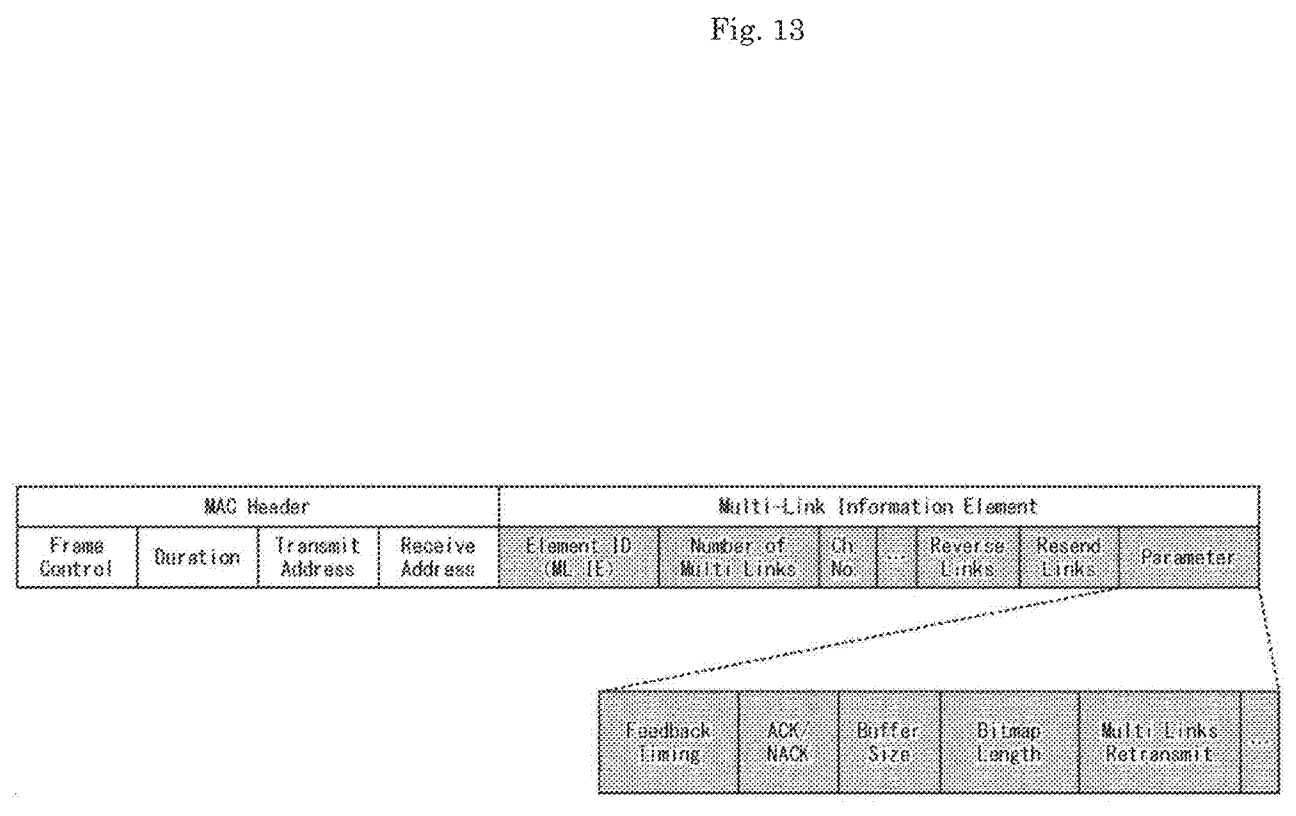

| MAC Header | | | Multi-Link Information Element | | | | | |
|---|---|---|---|---|---|---|---|---|
| Frame Control | Duration | Transmit Address | Receive Address | Element ID (MLIE) | Number of Multi Links | Ch. No. | Reverse Links | Reserve Links | Parameter |

| Feedback Timing | ACK NACK | Buffer Size | Bitmap Length | Multi Links Retransmit |
|---|---|---|---|---|

Figure 15:
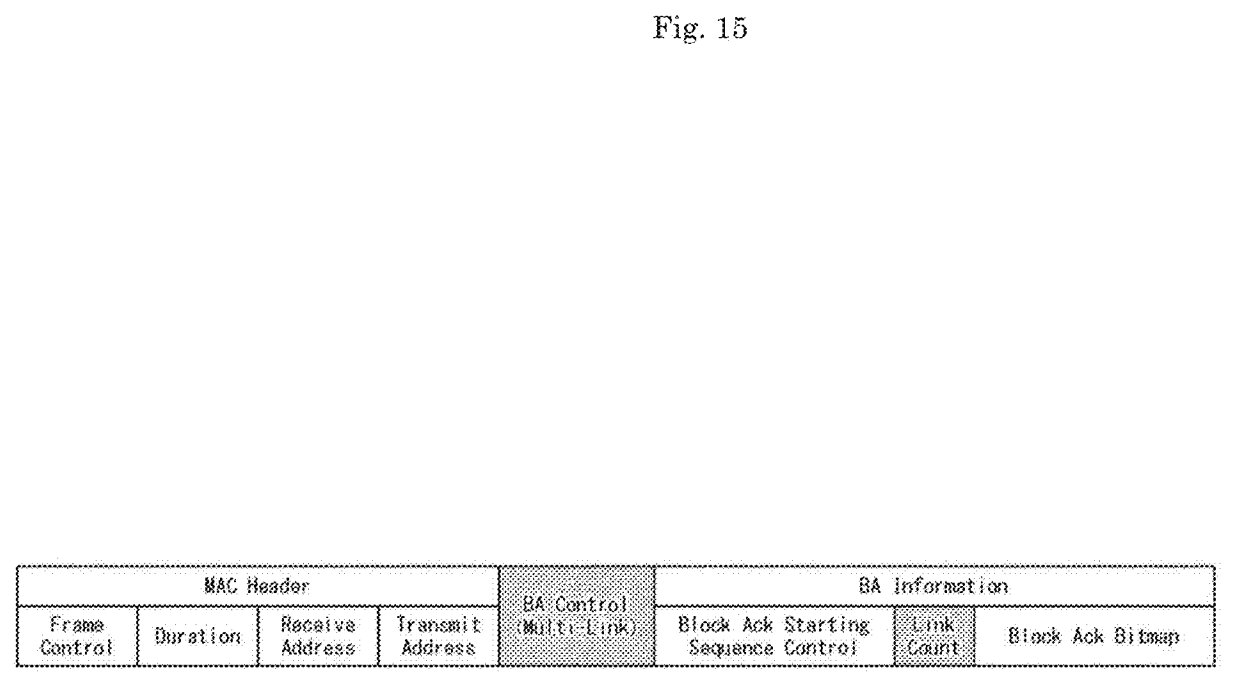

| MAC Header | | | | BA Control Multi-Link | BA Information | | |
|---|---|---|---|---|---|---|---|
| Frame Control | Duration | Receive Address | Transmit Address | | Block Ack Starting Sequence Control | Link Count | Block Ack Bitmap |

Fig. 16

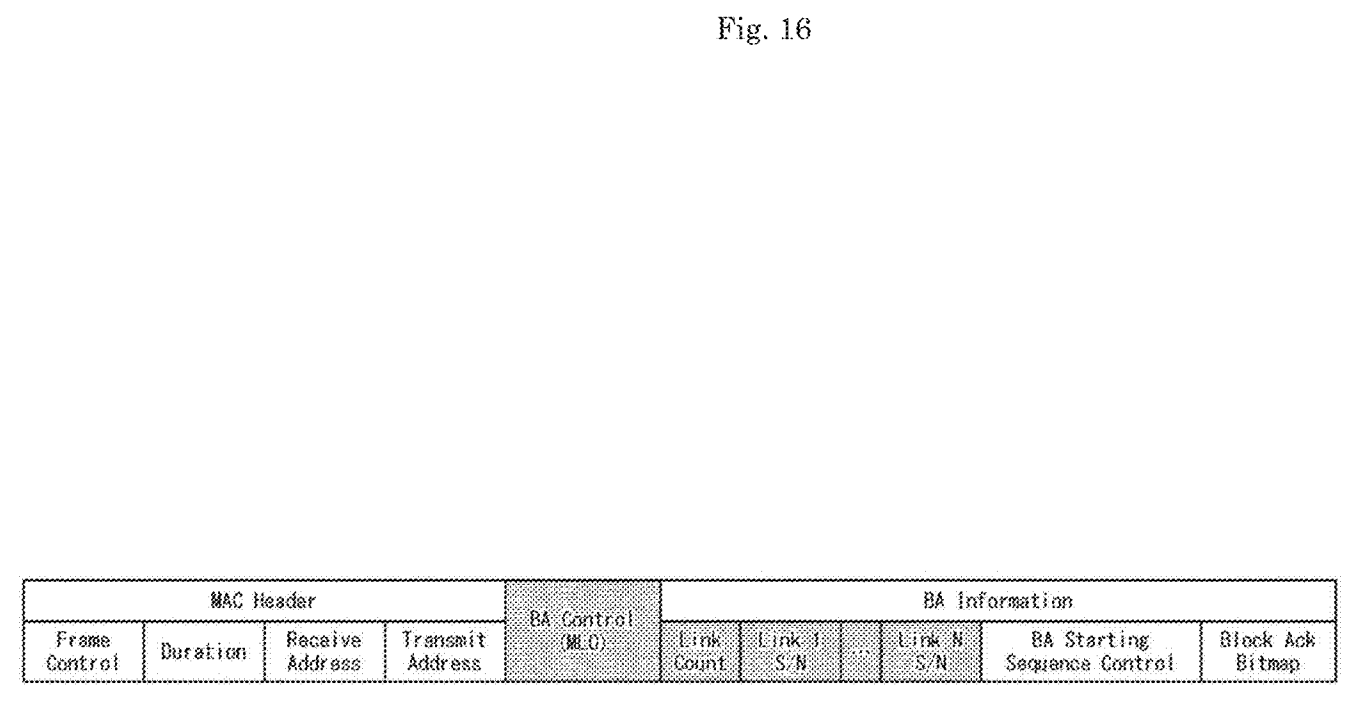

| MAC Header | | | | BA Control (M.O) | BA Information | | | | |
|---|---|---|---|---|---|---|---|---|---|
| Frame Control | Duration | Receive Address | Transmit Address | | Link Count | Link1 S/N | Link N S/N | BA Starting Sequence Control | Block Ack Bitmap |

Fig. 17

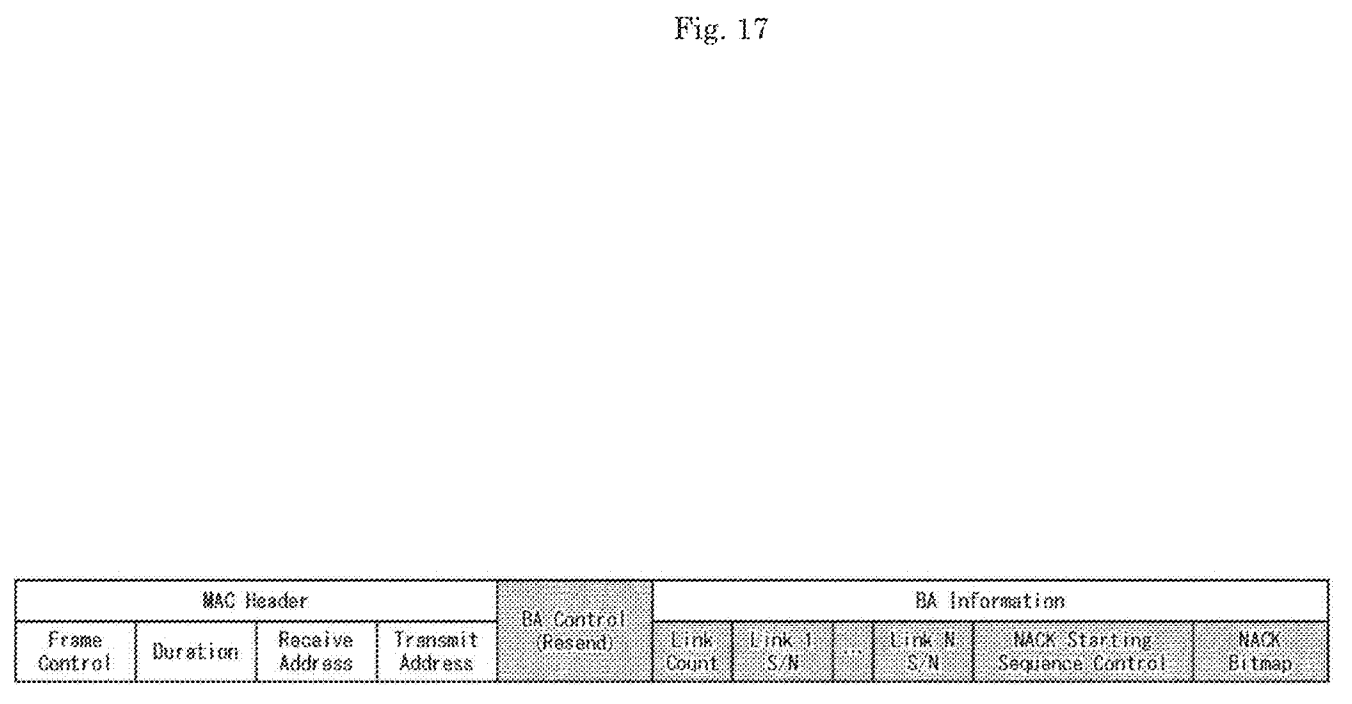

| MAC Header | | | | BA Control (Resend) | BA Information | | | | | |
|---|---|---|---|---|---|---|---|---|---|---|
| Frame Control | Duration | Receive Address | Transmit Address | | Link Count | Link 1 S/N | ... | Link N S/N | NACK Starting Sequence Control | NACK Bitmap |

Fig. 18

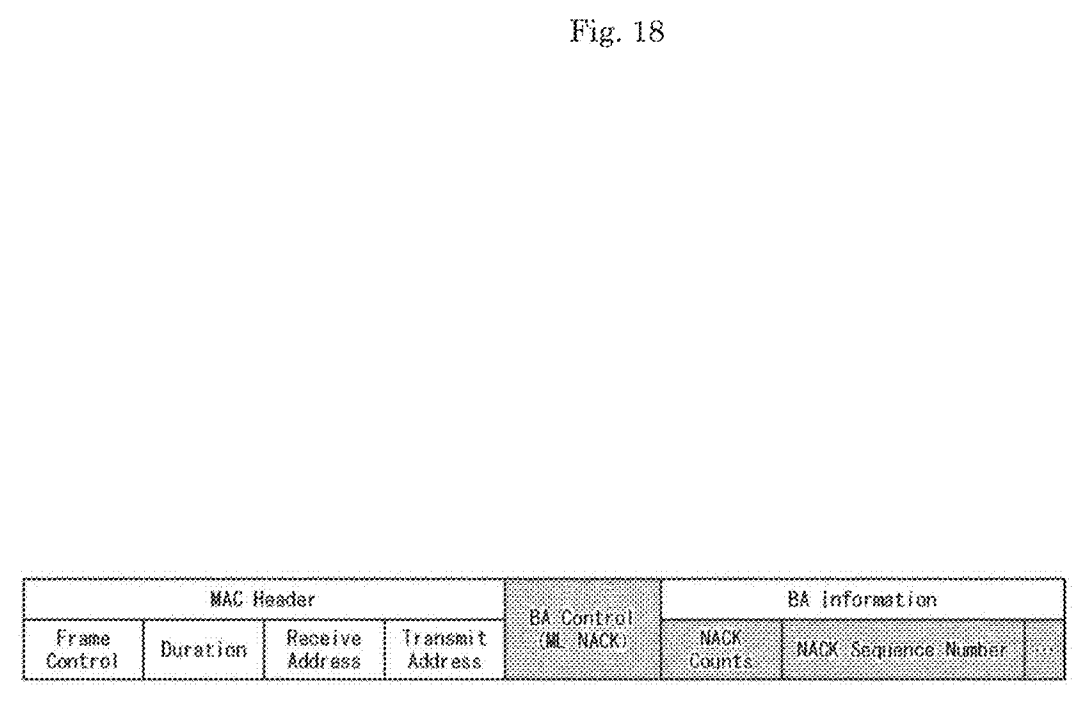

| MAC Header | | | BA Control (M NACK) | BA Information | |
|---|---|---|---|---|---|
| Frame Control | Duration | Receive Address | Transmit Address | | NACK Counts | NACK Sequence Number |

Fig. 19

COMMUNICATION DEVICE AND COMMUNICATION METHOD

CROSS-REFERENCE TO RELATED APPLICATIONS

The present application is based on PCT filing PCT/JP2021/037304, filed Oct. 8, 2021, which claims priority to Japanese Application No. 2020-178036, filed Oct. 23, 2020, the entire contents of each are incorporated herein by reference.

TECHNICAL FIELD

The present disclosure relates to a communication device and a communication method, and more particularly, to a communication device and a communication method that enable more suitable retransmission of undelivered data to be realized in communication using a plurality of links.

BACKGROUND ART

In the related art, technology regarding multi-user communication capable of simultaneously transmitting different pieces of data to a plurality of wireless terminals is known.

For example, PTL 1 discloses a communication method for receiving a data frame in which retransmission data and data addressed to other users are multiplexed, when data retransmission is required in multi-user communication.

CITATION LIST

Patent Literature

[PTL 1]
JP 2017-55398 A

SUMMARY

Technical Problem

However, PTL 1 does not mention retransmission of undelivered data in communication using a plurality of links.

The present disclosure has been made in view of such circumstances, and is intended to realize more suitable retransmission of the undelivered data in communication using a plurality of links.

Solution to Problem

A communication device according to a first aspect of the present disclosure is a communication device including: an access control unit configured to control parallel transmission of data using a plurality of links in a wireless network; and a multi-link management unit configured to set retransmission of undelivered data using an available one of the links when the undelivered data is generated on a predetermined one of the links.

A communication method according to the first aspect of the present disclosure is a communication method including: controlling, by a communication device, parallel transmission of data using a plurality of links in a wireless network; and setting, by the communication device, retransmission of the undelivered data using an available one of the links when the undelivered data is generated on a predetermined one of the links.

A communication device according to the second aspect of the present disclosure is a communication device including: an access control unit configured to control parallel reception of data using a plurality of links in a wireless network; and a multi-link management unit configured to set reception acknowledgment information including information capable of specifying a reception situation of the data on another one of the links when the reception acknowledgment information is returned on one of the links, wherein the access control unit controls return of the reception acknowledgment information, and the multi-link management unit sets reception of retransmission data corresponding to the reception acknowledgment information using the one link.

A communication method according to a second aspect of the present disclosure is a communication method including: controlling, by a communication device, parallel reception of data using a plurality of links in a wireless network; and setting, by the communication device, reception acknowledgment information including information capable of specifying a reception situation of the data on another one of the links when the reception acknowledgment information is returned on one of the links; controlling, by the communication device, the return of the reception acknowledgment information; and setting, by the communication device, the link to receive the retransmission data.

In the first aspect of the present disclosure, the parallel transmission of the data using the plurality of links in the wireless network is controlled, and when the undelivered data is generated in the predetermined link, the retransmission of the undelivered data using the available link is set.

In the second aspect of the present disclosure, the parallel reception of the data using the plurality of links in the wireless network is controlled, the reception acknowledgment information including the information capable of specifying the reception situation of the data on the other link is set when the reception acknowledgment information is returned on the one link, the return of the reception acknowledgment information is controlled, and the link to receive the retransmission data is set.

BRIEF DESCRIPTION OF DRAWINGS

FIG. 6 is a diagram illustrating an example of retransmission of the undelivered data in a technology according to the present disclosure.

FIG. 10 is a diagram illustrating an example of retransmission of the undelivered data according to the technology according to the present disclosure.

FIG. 13 is a diagram illustrating a configuration example of a frame that is transmitted and received at the time of setup of a multi-link operation.

FIG. 14 is a diagram illustrating a configuration example of an A-MPDU frame.

FIG. 15 is a diagram illustrating a configuration example of a block ACK frame.

FIG. 16 is a diagram illustrating a configuration example of a block ACK frame.

FIG. 17 is a diagram illustrating a configuration example of a block ACK frame.

FIG. 18 is a diagram illustrating a configuration example of a block ACK frame.

FIG. 19 is a block diagram illustrating a configuration example of a communication device to which the technology according to the present disclosure is applied.

DESCRIPTION OF EMBODIMENTS

Figure 1:
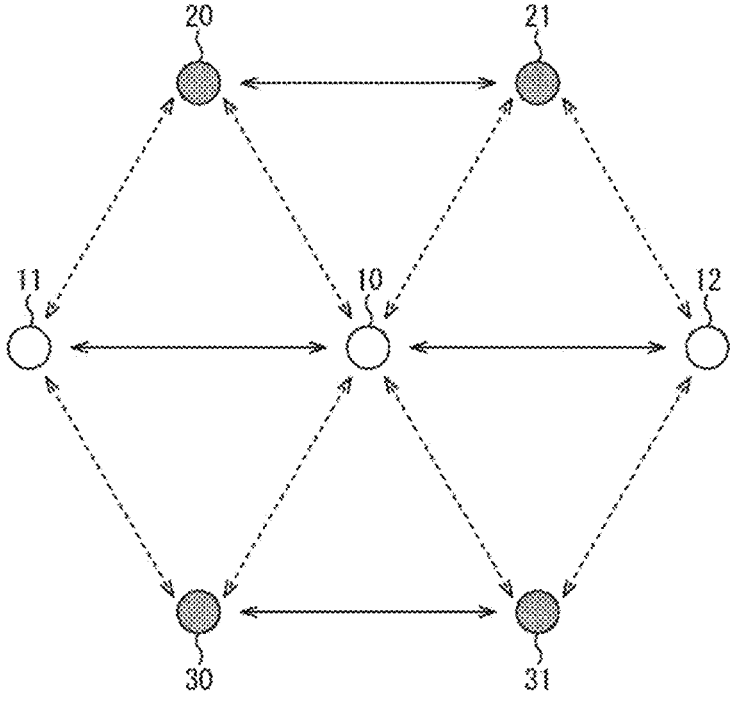
FIG. 1 is a diagram illustrating a configuration example of a wireless LAN system.

Hereinafter, modes for carrying out the present disclosure (hereinafter referred to as embodiments) will be described. The description will be given in the following order.

1. Multi-Link Operation and Issues Thereof
2. Overview of Technology According to Present Disclosure
3. Embodiment of Present Disclosure
3-1. Configuration Example of Wireless LAN System
3-2. Interference at Time of Data Reception
3-3. Example of Retransmission of Undelivered Data
3-4. Configuration Example of Data Frame
3-5. Configuration Example of Communication Device
3-6. Operation of Communication Device
4. Conclusion

1. Multi-Link Operation and Issues Thereof (Multi-Link Operation)

In the related art, in a wireless LAN system, a frequency channel having an arbitrary bandwidth in one frequency band is used for communication as one communication link (hereinafter simply referred to as a link). Specifically, technologies standardized according to IEEE 802.11b, 11g, and 11n are used for communication in a frequency 2.4 GHz band, and technologies standardized according to IEEE 802.11a, 11n, and 11ac are used in communication in a frequency 5 GHz band.

Further, in recent years, in a technology standardized according to IEEE 802.11ax, communication in a frequency 6 GHz band has been newly used.

These standards define a structure of an A-MPDU frame according to a frame aggregation technique for aggregating a plurality of pieces of data (MAC layer protocol data unit: MPDU) into one data frame.

Currently, the IEEE 802.11 task group (TG)be is studying a multi-link operation (MLO), which is a technology for transmitting and receiving data using a plurality of links (frequency bands).

In this multi-link operation, when reception acknowledgment information (ACK) of data is returned on a certain link, a method of returning the reception acknowledgment information as an ACK collectively including reception situations of data transmitted on other links has been examined.

On the other hand, in the related art, a method of receiving an ACK returned after data transmission on each link and retransmitting undelivered data on that link is generally used as a method of retransmitting undelivered data in a wireless LAN system.

(Issues of Multi-Link Operation)

In a data transmission sequence of the related art, management is performed by a series of sequence numbers being added to data transmitted on a certain link. Therefore, when the data transmitted on another link is retransmitted, data outside a range of the managed sequence numbers is retransmitted, and the management of the sequence numbers collapses. That is, unless the sequence numbers of all the links are collectively managed, it is not possible to specify a link that has transmitted data that has not been delivered.

Further, since the sequence number space is configured of a predetermined information length (approximately 12 bits), sequence numbers exceeding this range cannot be managed. That is, when retransmission data including a sequence number of data transmitted on a certain link is transmitted on another link, a series of sequence numbers within an assumed range do not match, and undelivered data and data to be retransmitted on each link cannot be specified.

Further, new data cannot be transmitted unless retransmission is completed by a predetermined retransmission timing. That is, in the multi-link operation, even when data transmitted on a plurality of links are collectively managed, the sequence number space cannot be used until retransmission is completed, and new data cannot be transmitted.

Further, even when a virtual carrier sense method based on a network allocation vector of the related art is used, if data transmission from another communication device is started after data transmission and ACK reception are completed, it is not possible to retransmit the undelivered data within a short period of time.

Therefore, in data transmission in the wireless LAN system, once an error occurs in data reception, it takes time to recover from the error. In particular, in a configuration of the A-MPDU frame, even when an error occurs in an MPDU on the way, the ACK cannot be returned until the MPDU at an end arrives, and the transmission side communication device cannot immediately ascertain the occurrence of the error.

Further, when undelivered data is specified and retransmitted, the undelivered data cannot be specified unless the ACK is received, and when the undelivered data is retransmitted, the undelivered data cannot be retransmitted until an access right is acquired on a link that becomes newly available. Therefore, when a large amount of data is retransmitted, it takes time to acknowledge reception of all the pieces of data. In particular, when there is an error in a part of the data, it is necessary to set a backoff time for transmitting data on a new link, and there is concern that more time is taken.

Further, when data in different access categories is transmitted on each link, a difference occurs in the backoff time required for retransmission, making it difficult to retransmit data in a short period of time. That is, when there is data having a sequence number that is not retransmitted, the sequence number space cannot be used any more, and therefore, there is concern that it is not possible to transmit data, particularly, in a preferential access category such as an application that requires transmission in a short time.

2. Overview of Technology According to Present Disclosure

In the technology according to the present disclosure, when data is transmitted using a plurality of links in the multi-link operation, undelivered data is retransmitted using a free link among links determined in advance.

Specifically, when the presence of undelivered data is ascertained, the transmission side communication device retransmits the undelivered data using a free link. Here, a specific link may be secured as the free link in advance, or undelivered data may be retransmitted using a link that becomes available at the latest timing.

Further, in order to ascertain a reception situation of the reception side communication device, the transmission side communication device forms an A-MPDU frame having a short frame length using frame aggregation as necessary so that the reception acknowledgment information (ACK) is early returned. This makes it possible for the transmission side communication device to early ascertain the presence of undelivered data. That is, the transmission side communication device performs backoff control in advance on a link set for use, and retransmits the undelivered data immediately after ascertaining the presence of the undelivered data.

In order to retransmit the undelivered data in a short period of time, the transmission side communication device secures a transmission opportunity (TXOP) in advance and transmits the data, and completes the retransmission of the undelivered data within the TXOP without passing through a new backoff procedure when the transmission side communication device ascertains the presence of the undelivered data.

On the other hand, the reception side communication device ascertains that data transmitted on the other link has been retransmitted using a certain link, and combines the data received on the other link to construct the entire data. Here, the reception acknowledgment information is sequentially returned to the transmission side communication device via a predetermined link, and the undelivered data is retransmitted by the transmission side communication device using the free link.

Further, when the reception side communication device constructs the reception acknowledgment information, the reception side communication device writes the sequence number of the received data in the block ACK frame so that data not delivered in each link can be specified, and specifies data of which retransmission is requested.

Further, the reception side communication device notifies the transmission side communication device of a link that can be used for retransmission, thereby ascertaining that undelivered data is retransmitted on a predetermined link, and centrally managing data received on a plurality of links. Further, the reception side communication device writes the latest sequence number of the data received on each link as parameter information of the block ACK frame so that an error occurrence situation of the received data can be ascertained.

Accordingly, when a plurality of MPDUs are aggregated and transmitted according to the frame aggregation, the undelivered data is early ascertained and the undelivered data is retransmitted using a free link, making it possible to shorten required time from return of the ACK to retransmission of the undelivered data.

Further, since the latest sequence number of the data received on each link is written as parameter information of the block ACK frame, the undelivered data is reliably notified even when there is a time delay required for data decoding processing and return of the block ACK frame.

3. Embodiment of Present Disclosure

Hereinafter, a wireless communication system according to an embodiment of the present disclosure will be described.

(3-1. Configuration Example of Wireless LAN System)

FIG. 1 is a diagram illustrating a configuration example of a wireless LAN system to which the technology according to the present disclosure can be applied.

In the wireless LAN system of FIG. 1, a first wireless network is constructed by connecting a communication device 11 and a communication device 12 to an access point 10. Near the first wireless network, a second wireless network is constructed by the access point 20 and the communication device 21, and a third wireless network is constructed by the access point 30 and the communication device 31.

The access point 10 is present at a position at which signals from the access point 20, the communication device 21, the access point 30, and the communication device 31 can be received. The communication device 11 is present at a position at which signals from the access points 20 and 30 can be received. The communication device 12 is present at a position at which signals from the communication device 21 and communication device 31 can be received.

In such a wireless LAN system, the communication device 11 and the communication device 12 forming the first network need to have fair access even when the second wireless network or the third wireless network is present.

Figure 2:
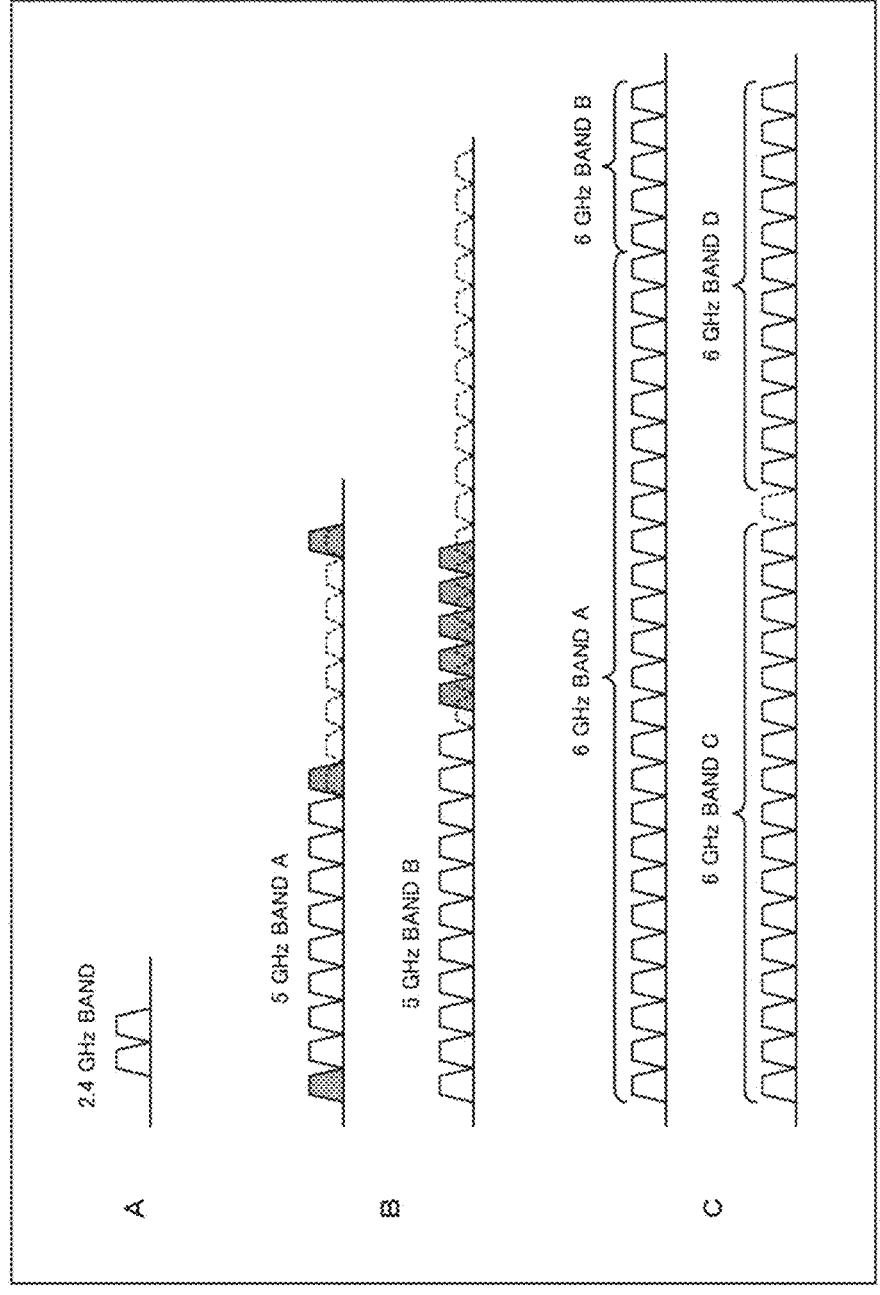
FIG. 2 is a diagram illustrating an available frequency band and channel allocation.

FIG. 2 is a diagram illustrating available frequency bands and channel allocation in a wireless communication system to which the technology according to the present disclosure is applied.

As illustrated in A of FIG. 2, in a 2.4 GHz band, at least two channels are allocated when an OFDM wireless signal with a 20 MHz bandwidth has been applied on the basis of the IEEE 802.11g standard.

Further, as illustrated in B of FIG. 2, in a 5 GHz band, many channels are allocated when an OFDM wireless signal with a 20 MHz bandwidth has been applied on the basis of the IEEE 802.11a standard, or the like.

However, the channel allocation in the 5 GHz band is differently operated depending on countries or areas, and a legal system of each country defines an available frequency range, transmission power, conditions for determining whether transmission is possible, and the like.

For example, in Japan, it is possible to use eight channels from channel 36 to channel 64 (5 GHz band A) and 11 channels from channel 100 to channel 140 (5 GHz band B), which are indicated in white in B of FIG. 2.

In countries and areas other than Japan, channel 32, channel 68, channel 96, channel 144, and channels 149 to 173 are also available, as indicated in black or by dashed lines in B of FIG. 2.

Further, as illustrated in C of FIG. 2, more channels are allocated in a 6 GHz band that is currently being standardized. Specifically, for example, 25 channels in a UNII-5 band of 6 GHz band A, 5 channels in a UNII-6 band of 6 GHz band B, 17 channels in a UNII-7 band of 6 GHz band C, and 12 channels in a UNII-8 band of 6 GHz band D are available.

(3-2. Interference at Time of Data Reception)

Interference at the time of data reception will be described with reference to FIGS. 3 and 4.

Figure 3:
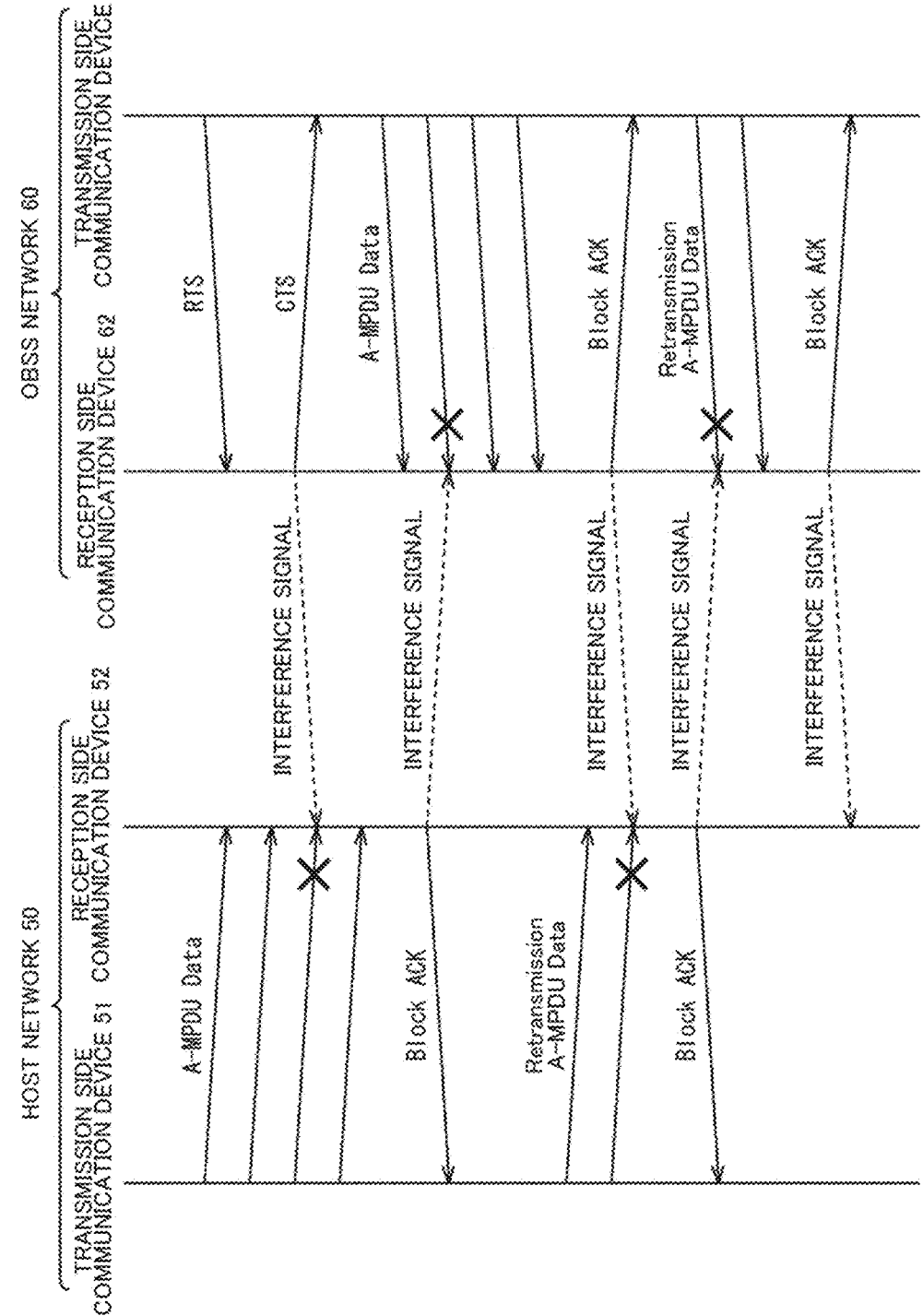
FIG. 3 is a sequence diagram illustrating interference at the time of data reception.

FIG. 3 is a sequence diagram illustrating an example of collision between data and the ACK in the data transmission sequence of the related art.

In a communication scheme of the related art, transmission of data and return of the ACK are performed on the same channel. Accordingly, a signal transmitted from a nearby network interferes with reception in a host network, or a signal transmitted from the host network interferes with reception in the nearby network.

In the example of FIG. 3, a host network 50 is configured of a transmission side communication device 51 and a reception side communication device 52, and an overlapping basic service set (OBSS) network 60, which is a nearby network, is configured of a transmission side communication device 61 and a reception side communication device 62.

For example, while in the host network 50, the reception side communication device 52 is receiving data (A-MPDU) from the transmission side communication device 51, the reception side communication device 62 returns a CTS with respect to an RTS from the transmission side communication device 61 in the OBSS network 60. In this case, the CTS from the reception side communication device 62 interferes with the data reception of the reception side communication device 52, and the reception side communication device 52 cannot receive and decode the data from the transmission side communication device 51 correctly.

Thereafter, while, in the OBSS network 60, the reception side communication device 62 is receiving data (A-MPDU) from the transmission side communication device 61, the reception side communication device 52 returns a block ACK with respect to data from the transmission side communication device 51 in the host network 50. In this case, the block ACK from the reception side communication device 52 interferes with the data reception of the reception side communication device 62, and the reception side communication device 62 cannot receive and decode the data from the transmission side communication device 61 correctly.

Further, while in the host network 50, the reception side communication device 52 is receiving data (retransmission A-MPDU) retransmitted from the transmission side communication device 51, the reception side communication device 62 returns a block ACK with respect to the data from the transmission side communication device 61 in the OBSS network 60. In this case, the block ACK from the reception side communication device 62 interferes with the data reception of the reception side communication device 52, and the reception side communication device 52 cannot correctly receive and decode the retransmission data from the transmission side communication device 51.

Further, while in the OBSS network 60, the reception side communication device 62 is receiving data (retransmission A-MPDU) retransmitted from the transmission side communication device 61, the reception side communication device 52 returns the block ACK with respect to the retransmission data from the transmission side communication device 51 in the host network 50. In this case, the block ACK from the reception side communication device 52 interferes with the data reception of the reception side communication device 62, and the reception side communication device 62 cannot correctly receive and decode the retransmission data from the transmission side communication device 61.

Thus, the signal from the reception side communication device 52 of the host network 50 and the signal from the reception side communication device 62 of the OBSS network 60 interfere with each other, and it takes a lot of time to finally transmit all the pieces of data.

Figure 4:
FIG. 4 is a sequence diagram illustrating interference at the time of data reception.

FIG. 4 is a sequence diagram illustrating an example of the multi-link operation using nearby frequency bands.

In the multi-link operation, when a plurality of links with close frequency bands are used, a signal that is returned on one link is likely to interfere with reception of data that is transmitted on the other link.

In the example of FIG. 4, the transmission side communication device 71 uses a 5 GHz band in Link 1 and a 6 GHz band in Link 2. Similarly, the reception side communication device 72 uses the 5 GHz band in Link 1 and the 6 GHz band in Link 2.

For example, the transmission side communication device 71 asynchronously transmits data (A-MPDU) using Link 1 and Link 2. The reception side communication device 72 uses Link 2 to return the block ACK because the data reception on Link 2 ends earlier than the data reception on Link 1. In this case, there is concern that the block ACK on Link 2 interferes with the reception of data on Link 1.

Thereafter, while the reception side communication device 72 receives the data (retransmission A-MPDU) transmitted on Link 2, the reception of the retransmission data on Link 1 ends and the block ACK is returned using Link 1. In this case, there is concern that the block ACK on Link 1 interferes with the reception of the retransmission data on Link 2.

Further, while the reception side communication device 72 receives the data (retransmission A-MPDU) transmitted on Link 1, the reception of the retransmission data on Link 2 ends and the block ACK is returned using Link 2. In this case, there is concern that the block ACK on Link 2 interfere with the reception of the retransmission data on Link 1.

Thus, in the multi-link operation using nearly frequency bands, the ACK returned by the reception side communication device 72 becomes an interference signal, and it takes a lot of time to finally transmit all the pieces of data.

(3-3. Example of Retransmission of Undelivered Data)

Here, an example of retransmission of the undelivered data in the communication scheme of the related art and an example of retransmission of the undelivered data in the technology according to the present disclosure will be specifically illustrated.

Figure 5:
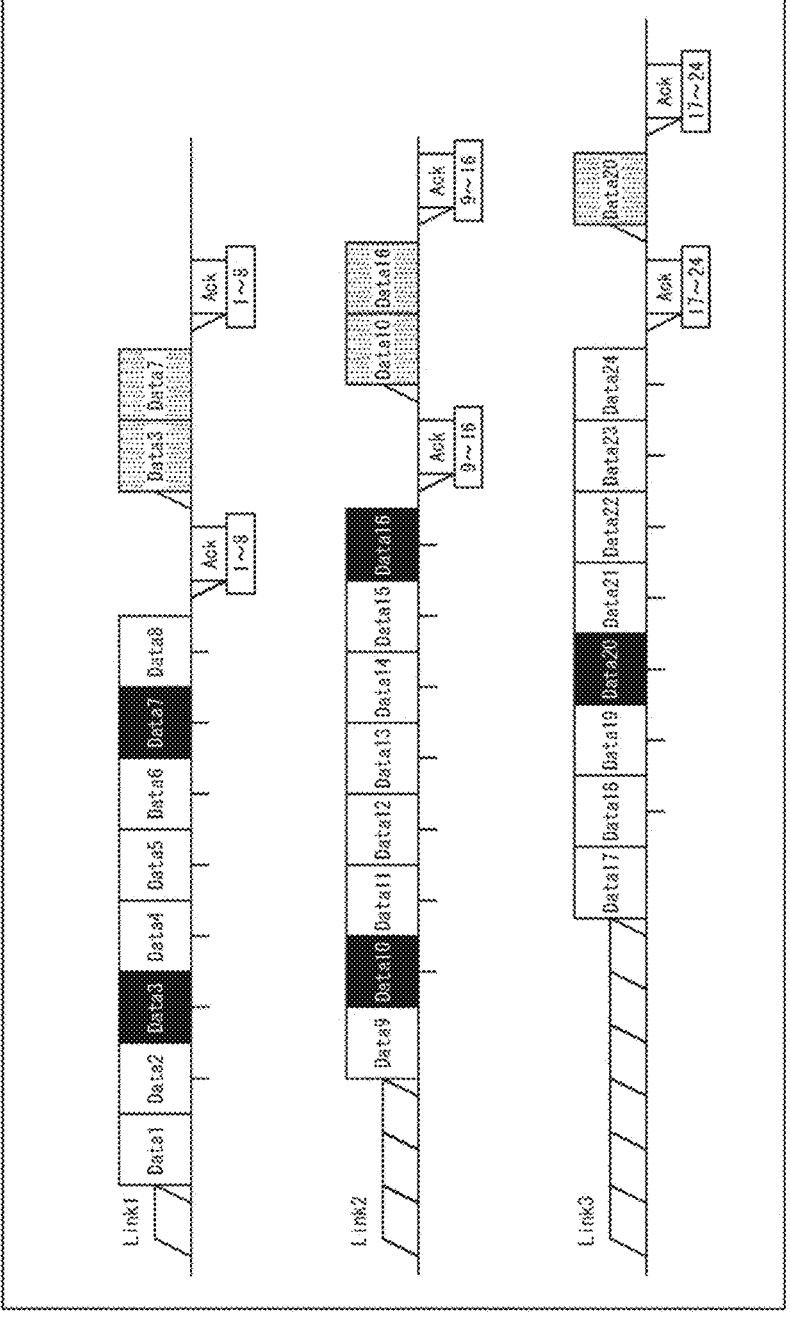
FIG. 5 is a diagram illustrating an example of retransmission of undelivered data using a plurality of links.

FIG. 5 is a diagram illustrating an example of retransmission of the undelivered data using a plurality of links in the communication scheme of the related art.

In the example of FIG. 5, data is transmitted using a first link (Link 1) to a third link (Link 3). Here, the sequence number of the data is managed for each link, the reception acknowledgment information (ACK) is returned, and the undelivered data is retransmitted for each link.

In Link 1, when the transmission side communication device acquires an access right under a predetermined access control, the transmission side communication device transmits data having sequence numbers 1 to 8 (Data 1 to Data 8) aggregated according to the frame aggregation as an A-MPDU frame.

The reception side communication device performs reception acknowledgment for Data 1 to Data 8. Here, Data 3 and Data 7 not correctly received due to an error are indicated in black in the drawing. That is, the reception side communication device returns the reception acknowledgment information (ACK) designating the correctly received data (Data 1, 2, 4 to 6, and 8) to the transmission side communication device after receiving the A-MPDU frame.

When the transmission side communication device ascertains the presence of the undelivered data using the ACK from the reception side communication device, the transmission side communication device retransmits the undelivered data (Data 3 and Data 7).

The reception side communication device returns the reception acknowledgment information (ACK) designating all correctly received pieces of data (Data 1 to Data 8) to the transmission side communication device after performing reception acknowledgment of the undelivered data (Data 3 and Data 7).

In Link 2, when the transmission side communication device acquires the access right under a predetermined access control, the transmission side communication device transmits the data having sequence numbers 9 to 16 (Data 9 to Data 16) aggregated according to the frame aggregation as an A-MPDU frame.

The reception side communication device performs reception acknowledgment for Data 9 to Data 16. Here, Data 10 and Data 16 not correctly received due to an error are indicated in black in the drawing. That is, the reception side communication device returns the reception acknowledgment information (ACK) designating correctly received data (Data 9, and 11 to 15) to the transmission side communication device after receiving the A-MPDU frame.

When the transmission side communication device ascertains the presence of the undelivered data using the ACK from the reception side communication device, the transmission side communication device retransmits the undelivered data (Data 10 and Data 16).

The reception side communication device returns the reception acknowledgment information (ACK) designating all correctly received pieces of data (Data 9 to Data 16) to the transmission side communication device after performing reception acknowledgment of the undelivered data (Data 10 and Data 16).

In Link 3, when the transmission side communication device acquires the access right under a predetermined access control, the transmission side communication device transmits data having sequence numbers 17 to 24 (Data 17 to Data 24) aggregated according to the frame aggregation as an A-MPDU frame.

The reception side communication device performs reception acknowledgment for Data 17 to Data 24. Here, Data 20 not correctly received due to an error is indicated in black in the drawing. That is, the reception side communication device returns the reception acknowledgment information (ACK) designating correctly received data (Data 17 to 19, and 21 to 24) to the transmission side communication device after receiving the A-MPDU frame.

When the transmission side communication device ascertains the presence of the undelivered data using the ACK from the reception side communication device, the transmission side communication device retransmits the undelivered data (Data 20).

The reception side communication device returns the reception acknowledgment information (ACK) designating all correctly received pieces of data (Data 17 to Data 24) to the transmission side communication device after performing reception acknowledgment of the undelivered data (Data 20).

As described above, in the communication scheme of the related art, when the undelivered data is retransmitted using a plurality of links, reception acknowledgment information (ACK) of data transmitted on another link is not included in the block ACK frame that is returned on each link. Therefore, it is necessary to retransmit data independently for each link.

Therefore, hereinafter, an example in which undelivered data is retransmitted using an available link when the undelivered data is generated in a predetermined link according to the technology according to the present disclosure will be described.

Figure 6:
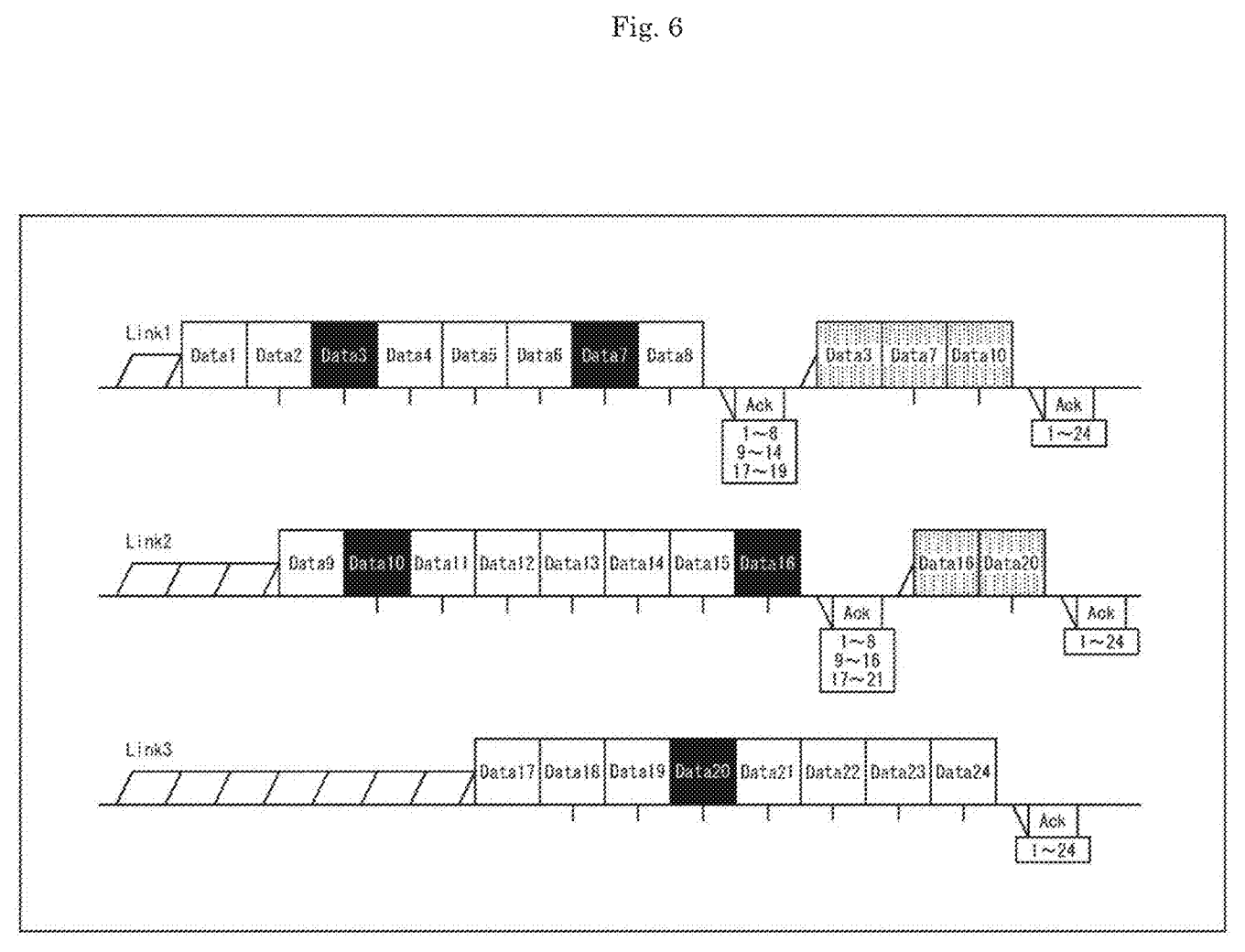

FIG. 6 is a diagram illustrating an example of retransmission of the undelivered data in the technology according to the present disclosure.

In the example of FIG. 6, data is transmitted using the first link (Link 1) to the third link (Link 3). Here, the sequence numbers of data in all the links are collectively managed, a block ACK frame including reception situations of data in other links is returned as the reception acknowledgment information (ACK), and undelivered data is retransmitted using an arbitrary link.

In the example of FIG. 6, as in the example of FIG. 5, as the A-MPDU frame, Data 1 to Data 8 are transmitted using Link 1, Data 9 to Data 16 are transmitted using Link 2, and Data 17 to Data 24 are transmitted using Link 3.

In Link 1, the reception side communication device ascertains a reception situation of the data in the other links (Link 2 and Link 3) after receiving the A-MPDU frames (Data 1 to Data 8). That is, the reception side communication device ascertains the reception situation of the data (Data 1 to Data 8, Data 9 to Data 14, and Data 17 to Data 19) having sequence numbers 1 to 8, 9 to 14, and 17 to 19, and returns the reception acknowledgment information (ACK) including the reception situation thereof to the transmission side communication device as the block ACK frame.

In this case, as indicated in black in the figure, the fact that Data 3 and Data 7 have not been correctly received on Link 1 and Data 10 has not been correctly received on Link 2 is written in the block ACK information. That is, an ACK including the block ACK information having the reception situation of the data including the other links described therein, collected by a timing at which the A-MPDU frame has been received on Link 1, is returned to the transmission side communication device. In this case, since it may take time to decode the received data in the reception side communication device, it may take a predetermined time to reflect the block ACK information.

When the transmission side communication device receives the ACK including the block ACK information having the undelivered data written therein, the transmission side communication device retransmits the undelivered data (Data 3, Data 7, and Data 10) using Link 1 that has become available at a point in time of the reception.

In Link 2, the reception side communication device ascertains a reception situation of the data in the other links (Link 1 and Link 3) after receiving the A-MPDU frames (Data 9 to Data 16). That is, the reception side communication device ascertains the reception situation of the data (Data 1 to Data 8, Data 9 to Data 16, and Data 17 to Data 21) having sequence numbers 1 to 8, 9 to 16, and 17 to 21, and returns the reception acknowledgment information (ACK) including the reception situation thereof to the transmission side communication device as the block ACK frame.

In this case, as indicated in black in the figure, the fact that Data 16 has not been correctly received on Link 2 and Data 20 has not been correctly received on Link 3 is written in the block ACK information. At this point in time, since the retransmission of previous undelivered data (Data 3, Data 7, and Data 10) has not started, the fact that Data 3, Data 7, and Data 10 have not been delivered may also be written in the block ACK information.

When the transmission side communication device receives the ACK including the block ACK information having the undelivered data written therein, the transmission side communication device retransmits the undelivered data (Data 16 and Data 20) except for the undelivered data (Data 3, Data 7, and Data 10) determined to be first retransmitted, using Link 2 that has become available at a point in time of the reception.

In Link 3, the reception side communication device ascertains a reception situation of the data in the other links (Link 1 and Link 2) after receiving the A-MPDU frames (Data 17 to Data 24). That is, the reception side communication device ascertains the reception situation of all the pieces of data (Data 1 to Data 24) having sequence numbers 1 to 24, and returns the reception acknowledgment information (ACK) including the reception situation thereof to the transmission side communication device as the block ACK frame.

In this case, when the retransmission data (Data 3, Data 7, Data 10, and Data 16) have been received, the fact is also written in the block ACK information.

At this point in time, only Data 20 has not been delivered, but since the transmission side communication device retransmits the undelivered data including Data 20 using Link 2, retransmission of Data 20 does not immediately start even when an ACK including block ACK information in which the fact that Data 20 has not been delivered has been written is received. That is, the transmission side communication device is configured to wait for return of the ACK for the retransmission data on Link 2, thereby determining whether or not re-retransmission is required.

The transmission side communication device receives, as an ACK for the retransmission data, an ACK including the block ACK information indicating that all pieces of data including Data 20 have been received, and ends a series of operations.

Figure 7:
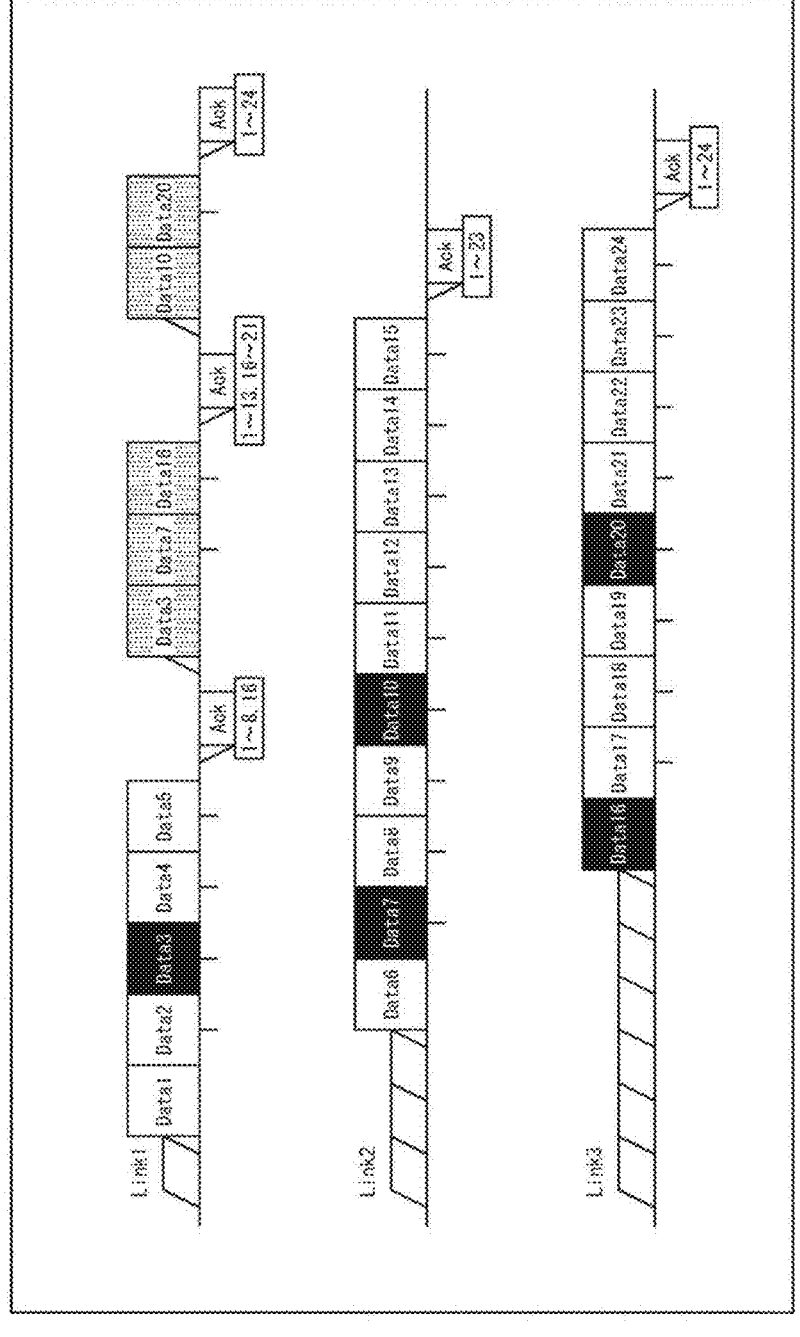
FIG. 7 is a diagram illustrating an example of retransmission of the undelivered data in the technology according to the present disclosure.

FIG. 7 is a diagram illustrating another example of the retransmission of the undelivered data in the technology according to the present disclosure.

In the example of FIG. 7, a configuration of the A-MPDU frame is set to be short on a link that starts data transmission earlier, so that the reception acknowledgment information (ACK) is returned at an earlier timing on that link.

That is, although a configuration in which, as the A-MPDU frame, Data 1 to Data 5 are transmitted using Link 1, Data 6 to Data 15 are transmitted using Link 2, and Data 16 to Data 24 are transmitted using Link 3 is adopted in the example of FIG. 7, other configurations may be adopted.

In Link 1, the reception side communication device ascertains a reception situation of the data in the other links (Link 2 and Link 3) after receiving the A-MPDU frames (Data 1 to Data 5). That is, the reception side communication device ascertains the reception situation of the data (Data 1 to Data 5, Data 6 to Data 8, and Data 16) having sequence numbers 1 to 5, 6 to 8, and 16, and returns the reception acknowledgment information (ACK) including the reception situation thereof to the transmission side communication device as the block ACK frame.

In this case, as indicated in black in the figure, the fact that Data 3 has not been correctly received on Link 1, Data 7 has not been correctly received on Link 2, and Data 16 has not been correctly received on Link 3 is written in the block ACK information, and ACK including the block ACK information is returned to the transmission side communication device.

A configuration in which when the transmission side communication device receives the ACK including the block ACK information having the undelivered data written therein, the transmission side communication device retransmits the undelivered data (Data 3, Data 7, and Data 16) using Link 1 that has become available at a point in time of the reception may be adopted.

The reception side communication device returns an ACK for the retransmission data (Data 3, Data 7, and Data 16) transmitted as the A-MPDU frames. This ACK includes block ACK information having a reception situation of data (Data 1 to Data 5, Data 6 to Data 13, and Data 16 to Data 21) having sequence numbers 1 to 5, 6 to 13, and 16 to 21 written therein.

In this case, as indicated in black in the figure, the fact that Data 10 has not been correctly received on Link 2 and Data 20 has not been correctly received on Link 3 is written in the block ACK information.

A configuration in that, when the transmission side communication device receives the ACK including the block ACK information having the undelivered data written therein, the transmission side communication device retransmits the undelivered data (Data 10 and Data 20) using Link 1 that has become available at a point in time of the reception may be adopted.

In Link 2, the reception side communication device ascertains a reception situation of the data in the other links (Link 1 and Link 3) after receiving the A-MPDU frames (Data 6 to Data 15). That is, the reception side communication device ascertains the reception situation of the data (Data 1 to Data 5, Data 6 to Data 15, and Data 16 to Data 23) having sequence numbers 1 to 5, 6 to 15, and 16 to 23, and returns the reception acknowledgment information (ACK) including the reception situation thereof to the transmission side communication device as the block ACK frame.

In this case, the fact that Data 10 and Data 20 whose reception has not been acknowledged at this point in time, including the retransmission data, have not yet been delivered is written in the block ACK information.

In Link 3, the reception side communication device ascertains a reception situation of the data in the other links (Link 1 and Link 2) after receiving the A-MPDU frames (Data 16 to Data 24). That is, the reception side communication device ascertains the reception situation of all the pieces of data (Data 1 to Data 24) having sequence numbers 1 to 24, and returns the reception acknowledgment information (ACK) including the reception situation thereof to the transmission side communication device as the block ACK frame.

In this case, the fact that Data 20 being retransmitted at this point in time has not yet been delivered is written in the block ACK information.

The transmission side communication device receives, as an ACK for the retransmission data in Link 1, an ACK including the block ACK information indicating that all pieces of data including Data 20 have been received, and ends a series of operations.

Figure 8:
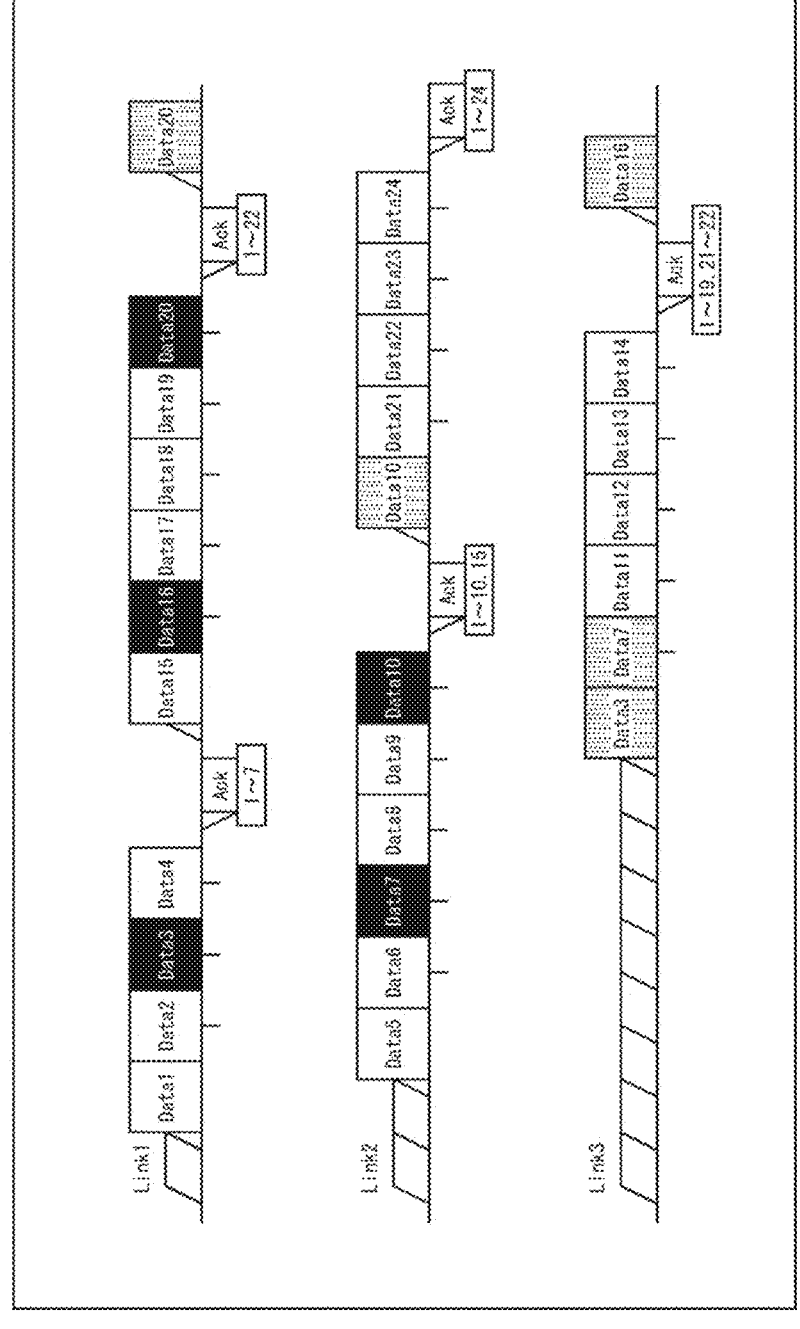
FIG. 8 is a diagram illustrating an example of retransmission of the undelivered data in the technology according to the present disclosure.

FIG. 8 is a diagram illustrating another example of retransmission of the undelivered data in the technology according to the present disclosure.

In the example of FIG. 8, a configuration of the A-MPDU frame is set to be short on all the links, so that the reception acknowledgment information (ACK) is returned at an earlier timing on all the links, and retransmission of the undelivered data is promoted.

That is, although a configuration in that, for example, an A-MPDU frame configured of four MPDUs is transmitted in Link 1 in which the access right is first acquired, and an A-MPDU frame configured of six MPDUs is transmitted in other links in the example of FIG. 8 is adopted, other configurations may be adopted.

In Link 1, the reception side communication device ascertains a reception situation of the data in the other link (Link 2) after receiving the A-MPDU frames (Data 1 to Data 4). That is, the reception side communication device ascertains the reception situation of the data (Data 1 to Data 4, Data 5 to Data 7) having sequence numbers 1 to 4 and 5 to 7, and returns the reception acknowledgment information (ACK) including the reception situation thereof to the transmission side communication device as the block ACK frame.

In this case, as indicated in black in the figure, the fact that Data 3 has not been correctly received on Link 1 and Data 7 has not been correctly received on Link 2 is written in the block ACK information, and ACK including the block ACK information is returned to the transmission side communication device.

When the transmission side communication device receives the ACK including the block ACK information having the undelivered data written therein, the transmission side communication device retransmits the undelivered data (Data 3 and Data 7) using Link 3 in a data transmission waiting state at a point in time of the reception. Specifically, the transmission side communication device constructs an A-MPDU frame by combining the undelivered data (Data 3 and Data 7) and newly transmitted data (Data 11 to Data 14), and transmits the A-MPDU frame to the reception side communication device.

A configuration in which, in Link 1 that has become available after reception of the ACK, an A-MPDU frame configured of data (Data 15 to Data 20) to be newly transmitted is subsequently transmitted may be adopted.

In Link 2, the reception side communication device ascertains a reception situation of the data in the other link (Link 1) after receiving the A-MPDU frames (Data 5 to Data 10). That is, the reception side communication device ascertains the reception situation of the data (Data 1 to Data 4, Data 5 to Data and Data 15) having sequence numbers 1 to 4, 5 to 10, and 15, and returns the reception acknowledgment information (ACK) including the reception situation thereof to the transmission side communication device as the block ACK frame.

In this case, as indicated in black in the figure, the fact that Data 10 has not been correctly received on Link 1 is written in the block ACK information, and ACK including the block ACK information is returned to the transmission side communication device.

When the transmission side communication device receives the ACK including the block ACK information having the undelivered data written therein, the transmission side communication device retransmits the undelivered data (Data using Link 2 that has become available at a point in time of the reception. Specifically, a configuration in that the transmission side communication device constructs an A-MPDU frame by combining the undelivered data (Data 10) and newly transmitted data (Data 21 to Data 24), and transmits the A-MPDU frame to the reception side communication device may be adopted.

In Link 3, the reception side communication device ascertains a reception situation of the data in the other links (Link 1 and Link 2) after receiving the A-MPDU frames (Data 3, Data 7, and Data 11 to Data 14). That is, the reception side communication device ascertains the reception situation of the data (Data 1 to Data 4, Data 5 to Data 10, Data 11 to Data 14, Data 15 to Data 19, Data 21, and Data 22) having sequence numbers 1 to 4, 5 to 10, 11 to 14, 15 to 19, 21, and 22, and returns the reception acknowledgment information (ACK) including the reception situation thereof to the transmission side communication device as the block ACK frame.

In this case, as indicated in black in the figure, the fact that Data 16 has not been correctly received on Link 1 is written in the block ACK information, and the ACK including the block ACK information is returned to the transmission side communication device.

When the transmission side communication device receives the ACK including the block ACK information having the undelivered data written therein, the transmission side communication device retransmits the undelivered data (Data 16) using Link 3 that has become available at a point in time of the reception. Specifically, a configuration in that the transmission side communication device constructs an A-MPDU frame including the undelivered data (Data 16), and transmits the A-MPDU frame to the reception side communication device may be adopted.

Further, in Link 1, after reception of the A-MPDU frames (Data 15 to Data 20), the reception side communication device returns the ACK including the block ACK information in which the fact that Data 16 and Data 20 have not been correctly received has been written, to the transmission side communication device.

In this case, a configuration in that, since Data 16 is retransmitted using Link 3, when the transmission side communication device receives the ACK including the block ACK information having the undelivered data written therein, the transmission side communication device retransmits only Data 20 using Link 1 that has become available at a point in time of the reception may be configured.

In Link 2, the transmission side communication device receives the ACK including the block ACK information in which the fact that all pieces of data (Data 1 to Data 24) have been received has been written.

Although not illustrated, the transmission side communication device receives, as an ACK for the retransmission data in Link 1 and Link 3, an ACK including the block ACK information indicating that all pieces of data including Data 16 and Data 20 have been received, and ends a series of operations.

Figure 9:
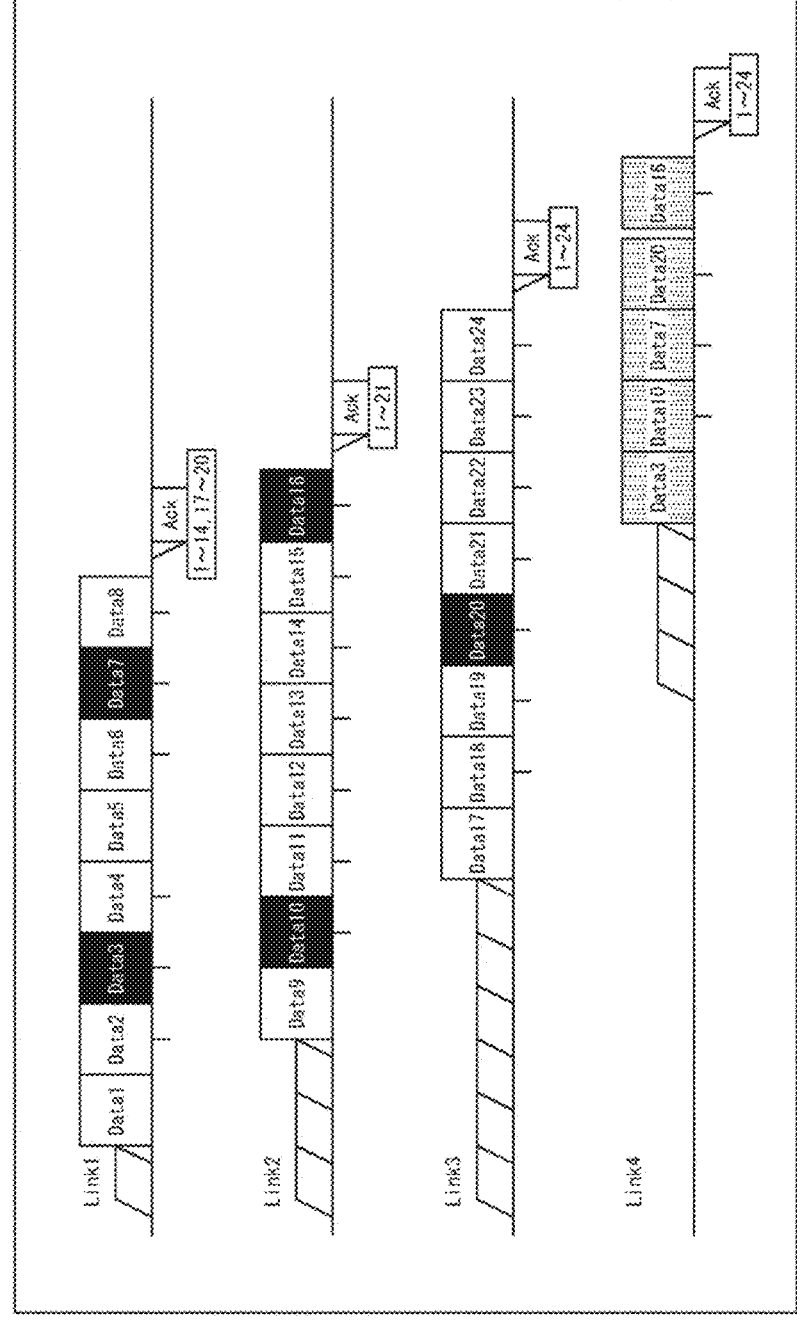
FIG. 9 is a diagram illustrating an example of retransmission of the undelivered data in the technology according to the present disclosure.

FIG. 9 is a diagram illustrating another example of retransmission of the undelivered data in the technology according to the present disclosure.

In the example of FIG. 9, a retransmission link for retransmission of the undelivered data is preset between the transmission side communication device and the reception side communication device, so that the undelivered data is retransmitted using the retransmission link so that the undelivered data is generated. That is, although a configuration in which data is transmitted using Link 1 to Link 3, and when the undelivered data is generated, the undelivered data is retransmitted using Link 4 set as a retransmission link is adopted in the example of FIG. 9, other configurations may be adopted.

In the example of FIG. 9, as the A-MPDU frame, Data 1 to Data 8 are transmitted using Link 1, Data 9 to Data 16 are transmitted using Link 2, and Data 17 to Data 24 are transmitted using Link 3.

In Link 1, the reception side communication device ascertains a reception situation of the data in the other links (Link 2 and Link 3) after receiving the A-MPDU frames (Data 1 to Data 8). That is, the reception side communication device ascertains the reception situation of the data (Data 1 to Data 8, Data 9 to Data 14, and Data 17 to Data 20) having sequence numbers 1 to 8, 9 to 14, and 17 to 20, and returns the reception acknowledgment information (ACK) including the reception situation thereof to the transmission side communication device as the block ACK frame.

In this case, as indicated in black in the figure, the fact that Data 3 and Data 7 have not been correctly received on Link 1, Data 10 has not been correctly received on Link 2, and Data 20 has not been correctly received on Link 3 is written in the block ACK information, and ACK including the block ACK information is returned to the transmission side communication device.

A configuration in which when the transmission side communication device receives the ACK including the block ACK information having the undelivered data written therein, the transmission side communication device retransmits the undelivered data (Data 3, Data 7, Data 10, and Data 20) using Link 4 set as a retransmission link is illustrated.

In Link 4, prior to retransmission of the undelivered data, carrier sense for access control is executed in advance so that it is ascertained that Link 4 is not used by other communication devices for a predetermined period of time.

Further, a transmission opportunity (TXOP) of a predetermined length of time may be set, and when the presence of undelivered data is ascertained, the undelivered data may be sequentially retransmitted.

That is, the transmission side communication device cannot ascertain that Data 16 has not been delivered on Link 2 only from the block ACK information included in the ACK on Link 2. Therefore, when the ACK is returned on Link 2, retransmission of the undelivered data (Data 3, Data 7, Data 10, and Data 20) is started using Link 4, but Data 16 that has been delivered is added and retransmitted immediately after that.

In the example of FIG. 9, the transmission side communication device receives, as an ACK for the retransmission data transmitted using Link 4, an ACK including the block ACK information indicating that all pieces of data have been received, and ends a series of operations.

Figure 10:
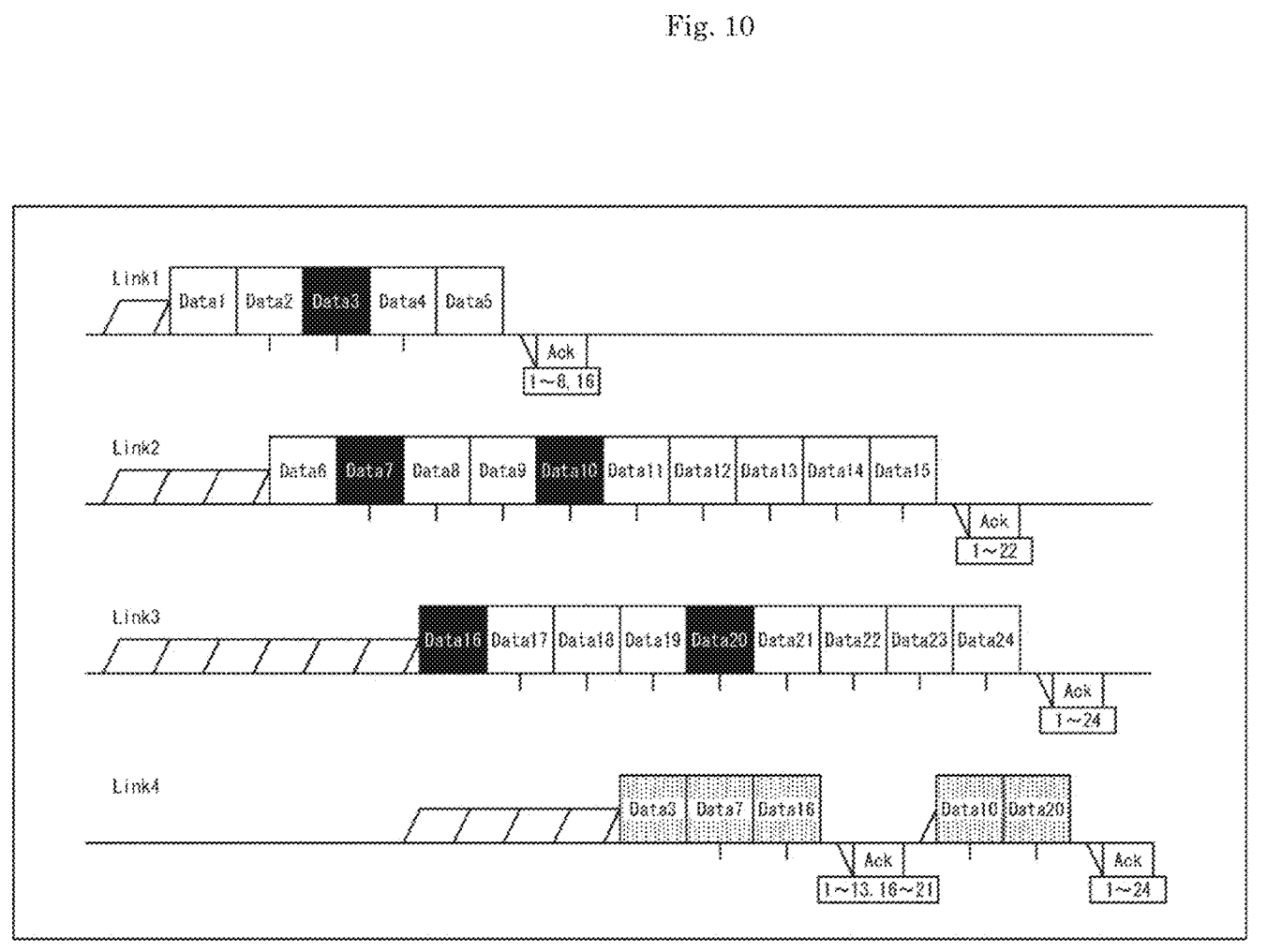

FIG. 10 is a diagram illustrating another example of the retransmission of the undelivered data in the technology according to the present disclosure.

In the example of FIG. 10, the retransmission link for retransmission of the undelivered data is preset between the transmission side communication device and the reception side communication device, so that the undelivered data is retransmitted using the retransmission link so that the undelivered data is generated. That is, in the example of FIG. 10, data is transmitted using Link 1 to Link 3, and when undelivered data is generated, the undelivered data is retransmitted using Link 4 set as a retransmission link. However, a configuration in which the reception side communication device notifies the transmission side communication device of the undelivered data by appropriately returning the ACK even in the retransmission link (Link 4) is adopted in the example of FIG. 10, other configurations may be adopted.

In the example of FIG. 10, as the A-MPDU frame, Data 1 to Data 5 are transmitted using Link 1, Data 6 to Data 15 are transmitted using Link 2, and Data 16 to Data 24 are transmitted using Link 3.

In Link 1, the reception side communication device ascertains a reception situation of the data in the other links (Link 2 and Link 3) after receiving the A-MPDU frames (Data 1 to Data 5). That is, the reception side communication device ascertains the reception situation of the data (Data 1 to Data 5, Data 6 to Data 8, and Data 16) having sequence numbers 1 to 5, 6 to 8, and 16, and returns the reception acknowledgment information (ACK) including the reception situation thereof to the transmission side communication device as the block ACK frame.

In this case, as indicated in black in the figure, the fact that Data 3 has not been correctly received on Link 1, Data 7 has not been correctly received on Link 2, and Data 16 has not been correctly received on Link 3 is written in the block ACK information, and ACK including the block ACK information is returned to the transmission side communication device.

A configuration in which when the transmission side communication device receives the ACK including the block ACK information having the undelivered data written therein, the transmission side communication device retransmits the undelivered data (Data 3, Data 7, and Data 16) using Link 4 set as the retransmission link is illustrated.

In Link 4, the reception side communication device ascertains a reception situation of the data in the other links (Link 1 to Link 3) after receiving the A-MPDU frames (Data 3, Data 7, and Data 16). That is, the reception side communication device ascertains the reception situation of the data (Data 1 to Data 5, Data 6 to Data 13, and Data 16 to Data 21) having sequence numbers 1 to 5, 6 to 13, and 16 to 21, and returns the reception acknowledgment information (ACK) including the reception situation thereof to the transmission side communication device as the block ACK frame.

In this case, as indicated in black in the figure, the fact that Data 10 has not been correctly received on Link 2, and Data 20 has not been correctly received on Link 3 is written in the block ACK information, and ACK including the block ACK information is returned to the transmission side communication device.

The transmission side communication device may be configured to retransmit the undelivered data (Data 10 and Data 20) using the retransmission link (Link 4) when the transmission side communication device receives the ACK including the block ACK information having the undelivered data written therein.

In Link 2 and Link 3 as well, after reception of the A-MPDU frame, the reception side communication device returns a latest ACK including block ACK information having the reception situation of the data at that timing written therein to the transmission side communication device.

In the example of FIG. 10, the transmission side communication device receives, as an ACK for the retransmission data transmitted using Link 4, an ACK including the block ACK information indicating that all pieces of data have been received, and ends a series of operations.

Here, retransmission of the undelivered data will be described with reference to a sequence diagram between the transmission side communication device and the reception side communication device.

Figure 11:
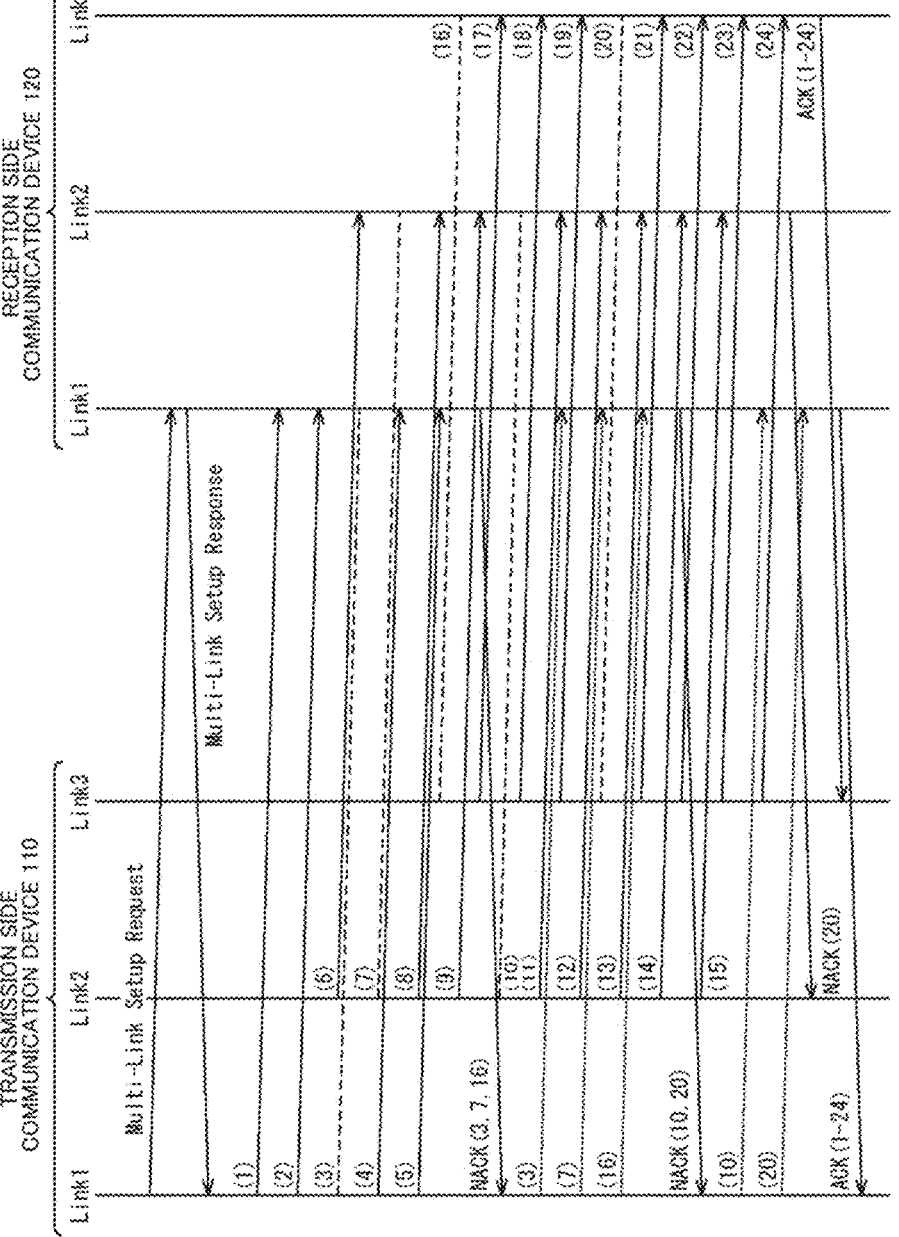
FIG. 11 is a sequence diagram illustrating the retransmission of the undelivered data.

FIG. 11 is a sequence diagram illustrating retransmission of the undelivered data corresponding to the example of FIG. 7 described above. In FIG. 11, transmission and reception of data in the multi-link operation between the transmission side communication device 110 and the reception side communication device 120 is illustrated.

First, the transmission side communication device 110 and the reception side communication device 120 exchange setup data frames for setting up the multi-link operation using a specific link (Link 1). This setup data frame includes parameter information such as information on a plurality of links used for data transmission and reception.

Specifically, the transmission side communication device 110 transmits a multi-link setup request as the setup data frame to the reception side communication device 120, and the reception side communication device 120 returns a multi-link setup response.

Accordingly, various types of parameter information are set between the transmission side communication device 110 and the reception side communication device 120. For example, it is set that Link 2 and Link 3 are used in addition to Link 1 for transmission and reception of data.

As a result, the transmission side communication device 110 uses a plurality of links (Link 1 to Link 3) to transmit data, and uses these links to receive the reception acknowledgment information (ACK). Further, the reception side communication device 120 uses the plurality of links (Link 1 to Link 3) to receive data and uses these links to return the reception acknowledgment information (ACK).

Here, as a data frame in which predetermined data are aggregated into one according to the frame aggregation, the A-MPDU frame in which the plurality of MPDUs have been aggregated is transmitted using each link, as described above. In each link, data is transmitted when a predetermined backoff time has elapsed and the transmission line has become available.

That is, the transmission side communication device 110 uses Link 1 that becomes available first to transmit data having sequence numbers 1 to 5 (data (1) to (5)). Next, the transmission side communication device 110 uses Link 2 that becomes available second to transmit data having sequence numbers 6 to 15 (data (6) to (15)). The transmission side communication device 110 uses Link 3 that becomes available last to transmit data having sequence numbers 16 to 24 (data (16) to (24)).

On the other hand, the reception side communication device 120 receives the A-MPDU frame transmitted using the respective links (Link 1 to Link 3), and sequentially decodes the data contained therein to collect an error-free data. In each link, data is received separately over time.

Further, at a timing after the reception of the A-MPDU frame on each link ends, the reception side communication device 120 returns an ACK including the block ACK information for specifying the MPDU received by that timing as the reception acknowledgment information (ACK) to the transmission side communication device 110.

That is, in Link 1, block ACK information (NACK (3, 7, and 16)) from which the data (3), (7), and (16) (indicated by dashed lines in the figure) that have not delivered by a timing after the reception of the data (1) to (5) ends can be identified is returned.

A configuration in which the transmission side communication device 110 retransmits data (3), (7), and (16) that have not delivered, using Link 1 that has become continuously available when transmission side communication device 110 receives NACK (3, 7, and 16) on Link 1 is illustrated.

Further, at a timing after the reception of data (3), (7), and (16) on Link 1 ends, the reception side communication device 120 returns an ACK including the block ACK information for specifying the MPDU received by that timing as the reception acknowledgment information (ACK) to the transmission side communication device 110.

That is, in Link 1, block ACK information (NACK (10 and 20)) from which the data (10) and (20) (indicated by dashed lines in the figure) that have not delivered by a timing after the reception of the data (3), (7), and (16) ends can be identified is returned.

A configuration in which the transmission side communication device 110 retransmits data (10), and (20) that have not delivered, using Link 1 that has become continuously available when transmission side communication device 110 receives NACK (10 and 20) on Link 1 is illustrated.

That is, in Link 2, block ACK information (NACK (20)) from which the data (20) (indicated by dashed lines in the figure) that has not delivered by a timing after the reception of the data (6) to (15) ends can be identified is returned.

However, since the transmission side communication device 110 is retransmitting the data (20) using Link 1, the transmission side communication device 110 waits for the ACK (block ACK information) returned after that without repeatedly retransmitting data (20) in Link 2.

Further, in Link 3, block ACK information (NACK (1 to 24)) from which all the pieces of data (1 to 24) can be identified is returned after the reception of the data (data (16) to (24)) ends.

Similarly, in Link 1, block ACK information (ACK (1 to 24)) from which all the pieces of data (1 to 24) can be identified is returned after the reception of the undelivered data (10) and (20) ends.

As described above, in the example of FIG. 7, a configuration in which in the multi-link operation between the transmission side communication device 110 and the reception side communication device 120, the undelivered data is retransmitted is illustrated.

Although the illustration is omitted, in the example of FIG. 8 as well, a configuration in which in the multi-link operation between the transmission side communication device 110 and the reception side communication device 120, the undelivered data is retransmitted is illustrated.

Figure 12:
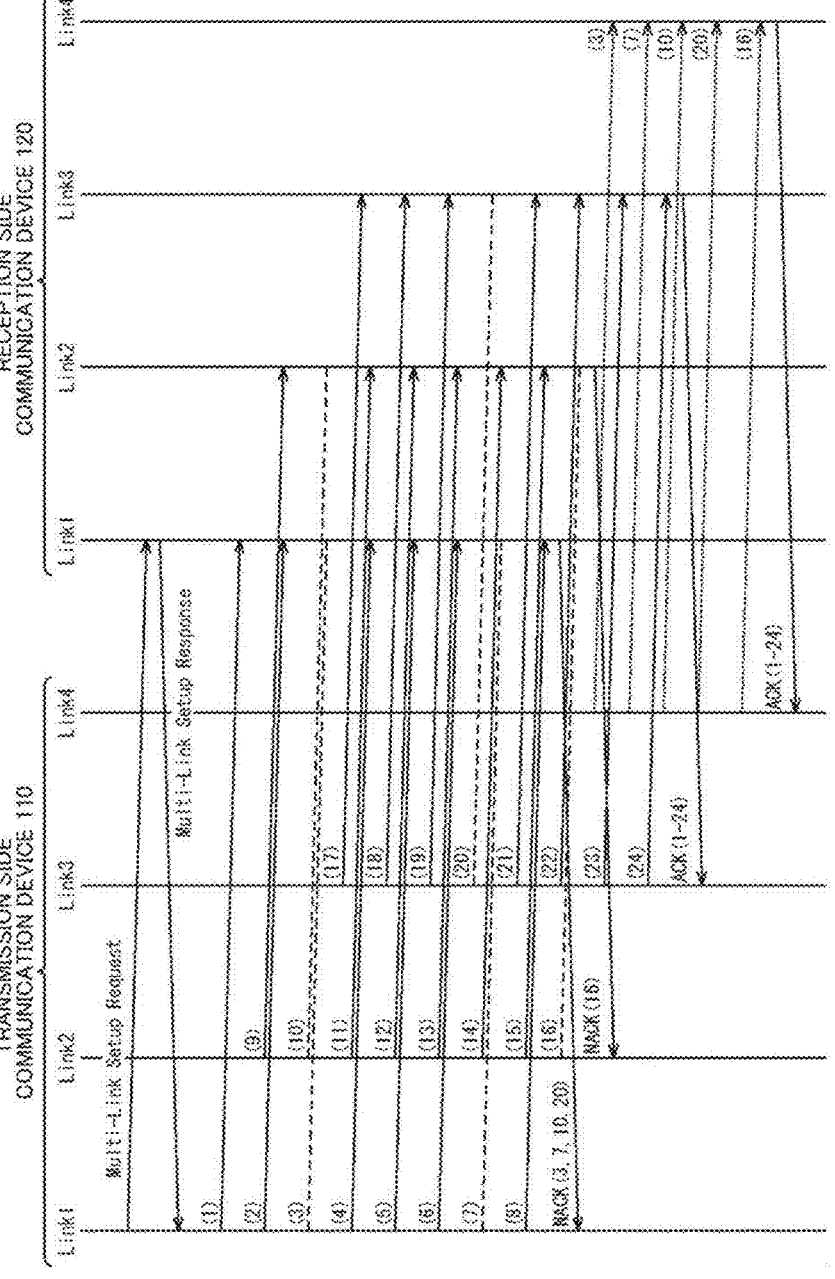
FIG. 12 is a sequence diagram illustrating the retransmission of the undelivered data.

FIG. 12 is a sequence diagram illustrating retransmission of the undelivered data corresponding to the example of FIG. 9 described above. FIG. 12 also illustrates transmission and reception of data in the multi-link operation between the transmission side communication device 110 and the reception side communication device 120.

First, the transmission side communication device 110 and the reception side communication device 120 exchange setup data frames for setting up the multi-link operation using a specific link (Link 1). This setup data frame includes parameter information such as information on a plurality of links used for data transmission and reception.

Specifically, the transmission side communication device 110 transmits a multi-link setup request as the setup data frame to the reception side communication device 120, and the reception side communication device 120 returns a multi-link setup response.

Accordingly, various types of parameter information are set between the transmission side communication device 110 and the reception side communication device 120. For example, it is set that Link 2 and Link 3 are used in addition to Link 1 for transmission and reception of data, and it is set that Link 4 is used as a retransmission link.

As a result, the transmission side communication device 110 uses the plurality of links (Link 1 to Link 3) to transmit data, and uses these links to receive the reception acknowledgment information (ACK). Further, the reception side communication device 120 uses the plurality of links (Link 1 to Link 3) to receive data and uses these links to return the reception acknowledgment information (ACK).

Further, when undelivered data is generated, the transmission side communication device 110 uses the retransmission link (Link 4) to retransmit the undelivered data, and the reception side communication device 120 uses the retransmission link (Link 4) to receive the undelivered data.

Here, as a data frame in which predetermined data is aggregated into one according to the frame aggregation, the A-MPDU frame in which the plurality of MPDUs have been aggregated is transmitted using each link, as described above. In each link, data is transmitted when a predetermined backoff time has elapsed and the transmission line has become available.

That is, the transmission side communication device 110 uses Link 1 that becomes available first to transmit data having sequence numbers 1 to 8 (data (1) to (8)). Next, the transmission side communication device 110 uses Link 2 that becomes available second to transmit data having sequence numbers 9 to 16 (data (9) to (16)). The transmission side communication device 110 uses Link 3 that becomes available last to transmit data having sequence numbers 17 to 24 (data (17) to (24)).

On the other hand, the reception side communication device 120 receives the A-MPDU frame transmitted using the respective links (Link 1 to Link 3), and sequentially decodes the data contained therein to collect an error-free data. In each link, data is received separately over time.

Further, at a timing after the reception of the A-MPDU frame on each link ends, the reception side communication device 120 returns an ACK including the block ACK information for specifying the MPDU received by that timing as the reception acknowledgment information (ACK) to the transmission side communication device 110.

That is, in Link 1, block ACK information (NACK (3, 7, 10, 20)) from which the data (3), (7), (10), and (20) (indicated by dashed lines in the figure) that have not delivered by a timing after the reception of the data (1) to (8) ends can be identified is returned.

A configuration in which when the transmission side communication device 110 receives NACK (3, 7, 10, 20) on Link 1, the transmission side communication device 110 uses Link 4 set as a retransmission link to start retransmission of the undelivered data (3), (7), (10) and (20) is illustrated.

On the other hand, in Link 2, block ACK information (NACK (16)) from which the data (16) (indicated by dashed lines in the figure) that has not delivered by a timing after the reception of the data (9) to (16) ends can be identified is returned. In this case, the fact that the data (10) and (20) among the undelivered data retransmitted using Link 4 have not been delivered may be written in the block ACK information.

A configuration in which when the transmission side communication device 110 receives NACK (16) on Link 2, the transmission side communication device 110 uses Link 4 set as a retransmission link to set retransmission of the data (16) in addition to the undelivered data (3), (7), (10), and (20) is illustrated.

Further, in Link 3, block ACK information (NACK (1 to 24)) from which all the pieces of data (1 to 24) can be identified is returned after the reception of the data (17) to (24) ends. The fact that the data (20) and (16) among undelivered data retransmitted using Link 4 have not been delivered may be written in the block ACK information.

Further, in Link 4, block ACK information (ACK (1 to 24)) from which all the pieces of data (1 to 24) can be identified is returned after the reception of all pieces of retransmission data (data (3), (7), (10), (20), and (16)) ends.

As described above, in the example of FIG. 9, a configuration in which the undelivered data is retransmitted in the multi-link operation between the transmission side communication device 110 and the reception side communication device 120 has been adopted, but the present disclosure is not limited to this configuration.

Although the illustration is omitted, in the example of FIG. 10 as well, the undelivered data is retransmitted in the multi-link operation between the transmission side communication device 110 and the reception side communication device 120.

(3-4. Configuration Example of Data Frame)

Here, a configuration example of data (data frame) transmitted and received in the multi-link operation between the transmission side communication device and the reception side communication device will be described.

FIG. 13 is a diagram illustrating a configuration example of a frame (setup data frame) that is transmitted and received at the time of setup of the multi-link operation.

The frame illustrated in FIG. 13 is transmitted as a multi-link setup request from the transmission side communication device and returned as a multi-link setup response from the reception side communication device.

The setup data frame consists of a MAC header and a multi-link information element.

The MAC header is configured of frame control including information such as a type of frame, a duration indicating a duration of the frame (time required for transmission), a transmit address indicating an address of a transmission source, and a receive address indicating an address of a transmission destination.

For example, the multi-link information element is configured of an element ID (ML IE), the number of multi links, Ch.No., reverse links, resend Links, and a parameter.

The element ID (ML IE) indicates a type of element. The number of multi links indicate the number of links in which multi-links can be set. Ch.No. indicates a channel number of the link in which multi-links can be set and is set by a value of the number of multi-links. The reverse links indicate links set as links for a reverse direction (links for return) among links for which multi-link has been set. The resend links indicate links set as retransmission links among the links in which multi-links has been set.

The parameter is parameter information regarding transmission and reception of data, and includes parameter information such as a feedback timing, ACK/NACK, a buffer size, a bitmap length, and Multi Links Retransmit.

The feedback timing indicates a timing of feedback in the links for a reverse direction. ACK/NACK indicates which of ACK information and NACK information are returned as reception acknowledgment information. The buffer size indicates a capacity of a buffer. The bitmap length indicates a bitmap length of the ACK information. The multi links retransmit includes, for example, information on whether the frame aggregation is to be executed, as information on data retransmission in the multi-link operation.

For example, desired values are set as various types of parameter information in the parameters of the multi-link setup request transmitted from the transmission side communication device, and values settled as various types of parameter information are set in parameters of the multi-link setup response returned from the reception side communication device. This makes it possible for the transmission side communication device and the reception side communication device to execute the setup of the multi-link operation by exchanging the multi-link setup request and the multi-link setup response.

Figure 14:
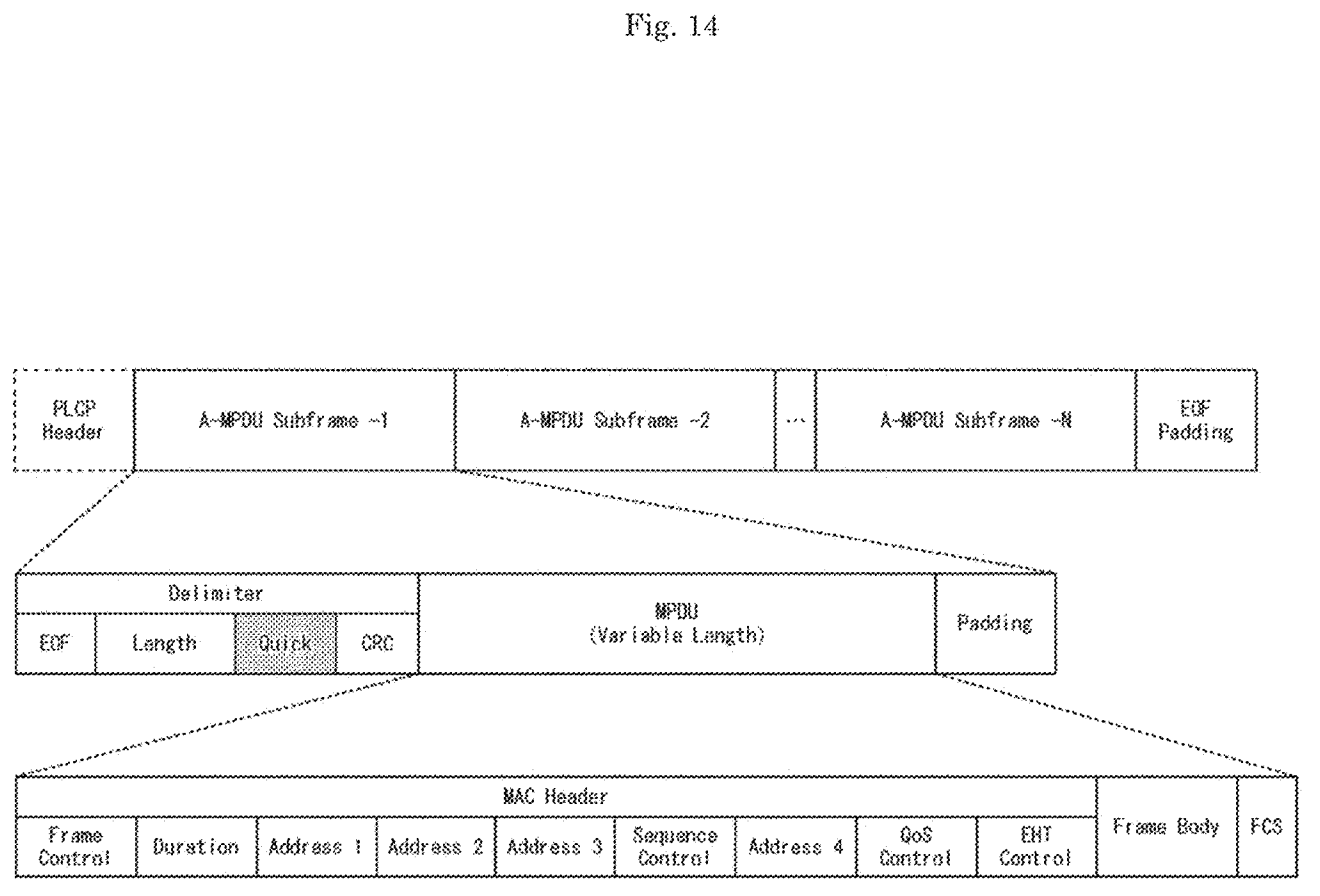

FIG. 14 is a diagram illustrating a configuration example of the A-MPDU frame in the multi-link operation of the present disclosure.

The A-MPDU frame illustrated in FIG. 14 is basically configured like an A-MPDU frame of the related art. That is, the A-MPDU frame in FIG. 14 is configured of a predetermined PLCH Header, a number of A-MPDU subframes aggregated according to the frame aggregation, and EOF Padding.

The A-MPDU subframe is configured of a predetermined delimiter, individual MPDUs, and padding. The MPDU is configured of a predetermined MAC header, a frame body in which actual data is stored, and a frame check sequence (FCS) for checking whether or not a frame is error-free.

In the A-MPDU frame of the present disclosure, a quick, for example, is included in the delimiter, in addition to the same EOF, Length, and CRC as in the related art. The quick is a bit for identifying that data is data that has not been delivered and has been retransmitted on another link in the multi-link operation. The quick may be configured to be set, for example, at a timing at which the reception acknowledgment information (ACK) from the reception side communication device has been received.

In the example of FIG. 14, the quick is set in the delimiter of all A-MPDU Subframes, but the quick may also be set in the PLCH header or EHT Control in the MAC header of each MPDU.

FIG. 15 is a diagram illustrating a configuration example of the block ACK frame in the multi-link operation of the present disclosure.

The block ACK frame illustrated in FIG. 15 is basically configured like a block ACK frame of the related art. That is, the block ACK frame in FIG. 15 is configured of predetermined MAC Header, BA Control, and BA Information.

In the block ACK frame of FIG. 15, "multi-link" for identifying that the block ACK frame is a block ACK frame in the multi-link operation is prepared as a value of the BA control.

Further, in the block ACK frame of FIG. 15, the BA information includes a link count, in addition to a block ack starting sequence control, and a block ack bitmap that are the same as those in the related art. For example, the link count indicates the number of links in the multi-link operation.

Further, in the multi-link operation of the present disclosure, since ACK information of a plurality of links is returned together, the block ack bitmap is configured with an information length longer than that of the block ACK frame of the related art.

FIG. 16 is a diagram illustrating another configuration example of the block ACK frame in the multi-link operation of the present disclosure.

The block ACK frame illustrated in FIG. 16 is also basically configured like the block ACK frame of the related art. That is, the block ACK frame in FIG. 16 is configured of a predetermined MAC Header, BA Control, and BA Information.

In the block ACK frame of FIG. 16, "MLO" for identifying that the block ACK frame is a block ACK frame for retransmission of undelivered data in the multi-link operation is prepared as a value of the BA control.

Further, in the block ACK frame of FIG. 16, the BA information includes, for example, a link count and Link 1 S/N to Link N S/N, in addition to the block ack starting sequence control and the block ack bitmap that are the same as those in the related art. The link count indicates the number of links in the multi-link operation. The Link 1 S/N to the Link N S/N indicates up to which sequence number data has been received in the respective links (Link 1 to Link N).

According to such a configuration of the block ACK frame, it is possible to specify a range of undelivered data that cannot be ascertained in the transmission side communication device due to a difference in processing capability of the reception side communication device. That is, the transmission side communication device can accurately ascertain the undelivered data in the reception side communication device.

FIG. 17 is a diagram illustrating still another configuration example of the block ACK frame in the multi-link operation of the present disclosure.

The block ACK frame illustrated in FIG. 17 is also basically configured like a block ACK frame of the related art. That is, the block ACK frame in FIG. 17 is configured of a predetermined MAC Header, BA Control, and BA Information.

In the block ACK frame of FIG. 17, "Resend" for identifying that the block ACK frame is a block ACK frame for retransmission of undelivered data in the multi-link operation is prepared as a value of the BA control.

Further, in the block ACK frame of FIG. 17, the BA information includes, for example, link count, link 1 S/N to Link N S/N, NACK starting sequence control, and a NACK Bitmap. The link count indicates the number of links in the multi-link operation. The Link 1 S/N to the Link N S/N indicates up to which sequence number data has been received in the respective links (Link 1 to Link N).

Further, the NACK starting sequence control is an area with which block ack starting sequence control of the related art is replaced, and a first sequence number of data of which retransmission is requested is set. The NACK bitmap is an area with which the block ack bitmap of the related art is replaced, and indicates the sequence number of the data of which retransmission is requested.

FIG. 18 is a diagram illustrating still another configuration example of the block ACK frame in the multi-link operation of the present disclosure.

The block ACK frame illustrated in FIG. 18 is also basically configured like a block ACK frame of the related art. That is, the block ACK frame in FIG. 18 is configured of predetermined MAC Header, BA Control, and BA Information.

In the block ACK frame of FIG. 18, "ML NACK" for identifying that the block ACK frame is a block ACK frame for specifying only information of undelivered data in the multi-link operation is prepared as a value of the BA control.

Further, in the block ACK frame of FIG. 18, the BA information includes, for example, NACK counts and a NACK sequence number. The NACK counts indicate the number of pieces of undelivered data in the multi-link operation. The NACK sequence number indicates the sequence number of data that has not delivered in the multi-link operation, and is set by the number indicated by the NACK counts.

According to such a configuration of the block ACK frame, the transmission side communication device is notified of only the sequence number of the undelivered data without return of redundant bitmap information.

(3-5. Configuration Example of Communication Device)

Figure 19:
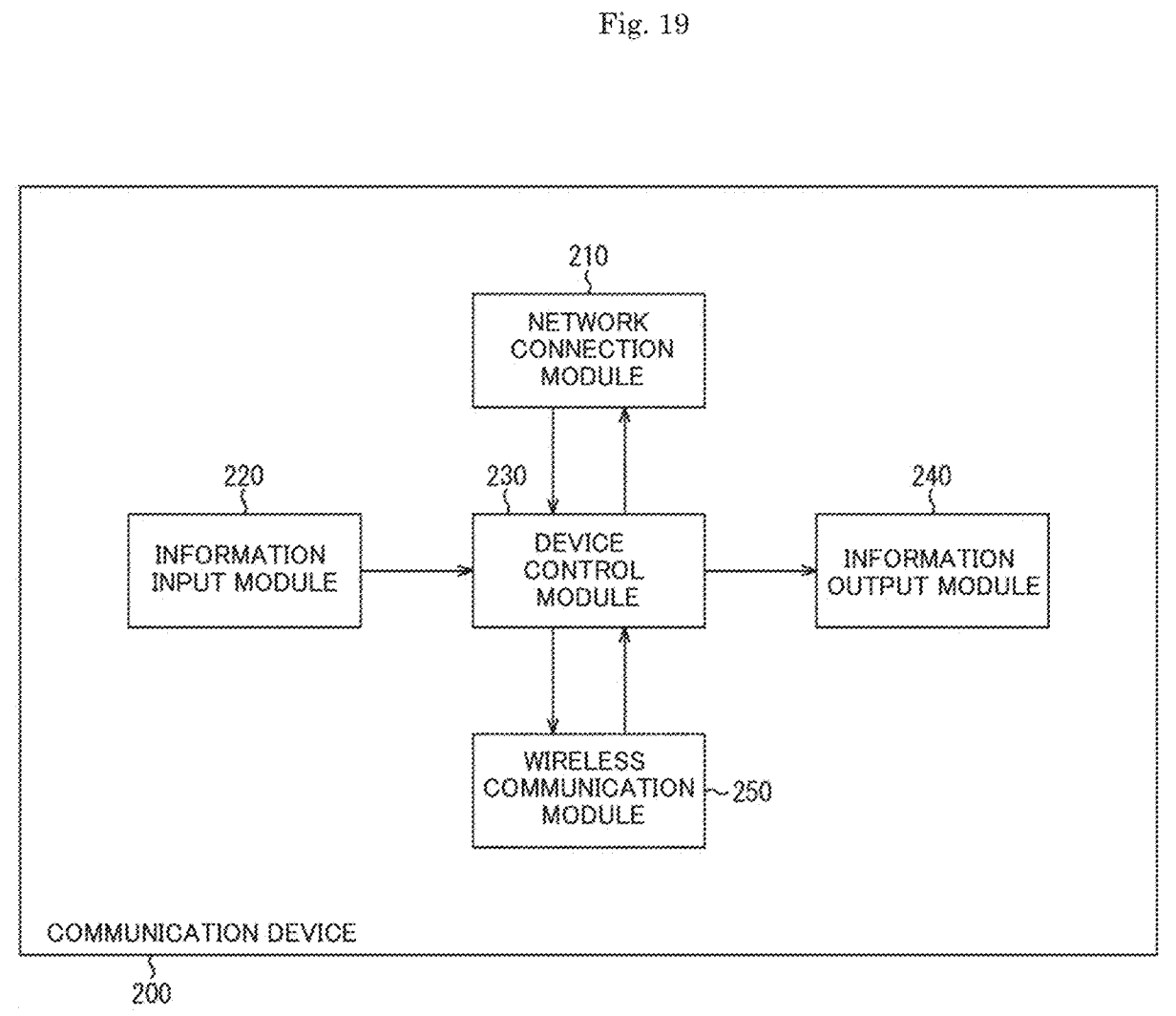

FIG. 19 is a block diagram illustrating a configuration example of a communication device to which the technology according to the present disclosure is applied.

The communication device 200 of FIG. 19 can function as at least one of the transmission side communication device and the reception side communication device described above, and can also function as an access point.

The Communication device 200 is configured to include a network connection module 210, an information input module 220, a device control module 230, an information output module 240, and a wireless communication module 250.

The network connection module 210 is configured, for example, as a communication modem for connecting to a network such as the Internet when the communication device 200 functions as an access point.

The network connection module 210 does not necessarily have to be incorporated within the communication device 200. The network connection module 210 may be configured, for example, as an optical network unit (ONU) that connects to the Internet via a public communication line and an Internet service provider.

The information input module 220 is a module that inputs information (instruction information) indicating an instruction of the user, and is configured of buttons, a keyboard, a touch panel, and the like. The information input module 220 also does not necessarily have to be incorporated within the communication device 200.

The device control module 230 performs control for causing the communication device 200 to operate as a transmission side communication device or a reception side communication device or to operate as an access point, on the basis of instruction information input to the information input module 220.

For example, when the communication device 200 is caused to operate as the transmission side communication device, the device control module 230 supplies data of a predetermined application to the wireless communication module 250 so that the data is transmitted to the transmission side communication device. On the other hand, when the communication device 200 is caused to operate as the reception side communication device, the device control module 230 causes the wireless communication module 250 to receive data from the transmission side communication device. The received data is provided to an application that is executed by the device control module 230.

The information output module 240 is a module that outputs an operating state of the communication device 200 or information acquired via the network connection module 210 and presents the operating state or the information to the user. The information output module 240 includes, for example, a display device such as an LED display, a liquid crystal panel, or an organic EL display, and a speaker that outputs voice or music.

The wireless communication module 250 performs wireless communication with another communication devices 200 or an external device.

Figure 20:
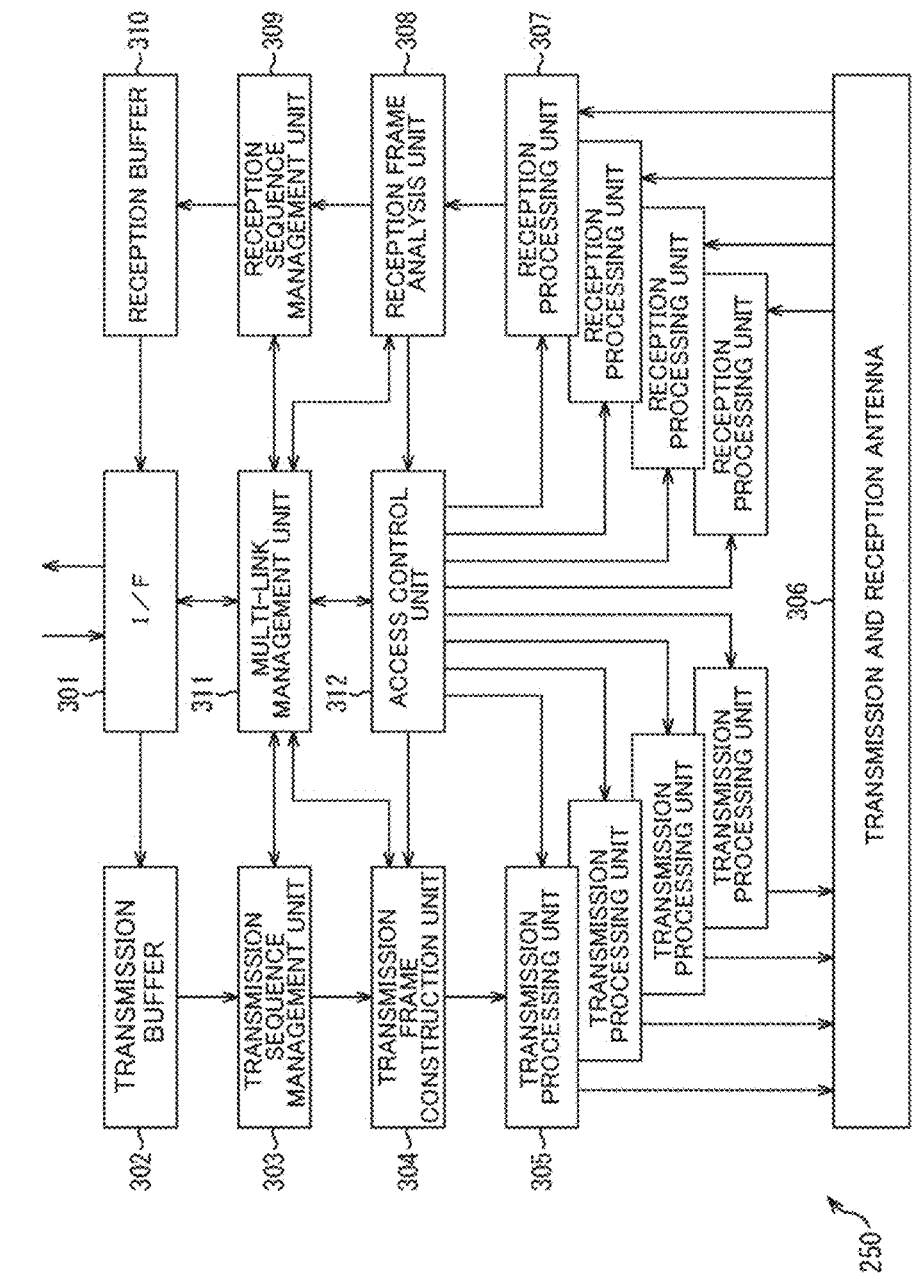
FIG. 20 is a block diagram illustrating a configuration example of a wireless communication module.

FIG. 20 is a block diagram illustrating a configuration example of the wireless communication module 250.

As illustrated in FIG. 20, the wireless communication module 250 includes an interface (I/F) 301, a transmission buffer 302, a transmission sequence management unit 303, a transmission frame construction unit 304, a transmission processing unit 305, and a transmission and reception antenna 306. Further, the wireless communication module 250 includes a reception processing unit 307, a reception frame analysis unit 308, a reception sequence management unit 309, a reception buffer 310, a multi-link management unit 311, and an access control unit 312.

The I/F 301 is connected to another module in the communication device 200 and exchanges various types of information and data. Specifically, the I/F 301 supplies data from other modules to the transmission buffer 302 or supplies data from the reception buffer 310 to the other module.

The transmission buffer 302 temporarily stores data from the I/F 301. The data stored in the transmission buffer 302 are sequentially supplied to the transmission sequence management unit 303.

The transmission sequence management unit 303 manages a sequence of data to be transmitted, in order to transmit the data from the transmission buffer 302 through wireless communication. The data to which the sequence numbers are added is sequentially supplied to the transmission frame construction unit 304.

The transmission frame construction unit 304 constructs an A-MPDU frame obtained by aggregating data from the transmission sequence management unit 303 according to the frame aggregation, or constructs a block ACK frame including the reception acknowledgment information (ACK). These constructed data frames are supplied to the transmission processing unit 305.

The transmission processing unit 305 is functionally provided for each of a plurality of links. The transmission processing unit 305 generates a transmission signal for each individual link on the basis of the data frame from the transmission frame construction unit 304, and performs predetermined signal processing. The transmission signal for each link is transmitted to the other communication device 200 via the transmission and reception antenna 306.

The transmission signal transmitted from the other communication device 200 is received as a reception signal for each link by the reception processing unit 307 via the transmission and reception antenna 306.

The reception processing unit 307 is also functionally provided for each of the plurality of links. The reception processing unit 307 decodes the reception signal for each link received via the transmission and reception antenna 306, and acquires the data frame (the A-MPDU frame or the block ACK frame). These acquired data frames are supplied to the reception frame analysis unit 308.

Thus, the transmission processing unit 305 and the reception processing unit 307 provided for each link can be used simultaneously even when the communication device 200 operates as a transmission side communication device and even when the communication device 200 operates as a reception side communication device.

The reception frame analysis unit 308 analyzes the data frame from the reception processing unit 307. For example, when the A-MPDU frame is received as a data frame, the reception frame analysis unit 308 analyzes the A-MPDU frame to determine whether or not each piece of data (MPDU) has been correctly received. Each received piece of data is supplied to the reception sequence management unit 309.

The reception sequence management unit 309 manages the sequence number of the reception data from the reception frame analysis unit 308 and supplies the data to the reception buffer 310. In particular, when the communication device 200 operates as a reception side communication device, the reception sequence management unit 309 generates ACK information or NACK information on the basis of the sequence number of the reception data, and supplies the ACK information or NACK information to the multi-link management unit 311.

The reception buffer 310 temporarily stores data from the reception sequence management unit 309. The data stored in the reception buffer 310 is output to the other module within the communication device 200 at predetermined timing via the I/F 301.

The multi-link management unit 311 manages various settings regarding the multi-link operation. For example, the multi-link management unit 311 sets a plurality of links that are used in the multi-link operation.

The access control unit 312 controls transmission and reception of data for each of the plurality of links set by the multi-link management unit 311. For example, the access control unit 312 controls the transmission processing unit 305 and the reception processing unit 307 provided for each link, thereby setting a backoff time for each link or acquiring a use situation of a transmission path.

For example, when the communication device 200 operates as the transmission side communication device, the access control unit 312 controls parallel transmission of data using a plurality of links, and the multi-link management unit 311 sets retransmission of undelivered data using available links when the undelivered data has been generated in a predetermined link.

The multi-link management unit 311 specifies undelivered data that needs to be retransmitted, on the basis of the reception acknowledgment information (ACK) from the reception side communication device, which is a transmission destination of the data.

The multi-link management unit 311 sets retransmission of the undelivered data using a link on which the data transmission has ended among the plurality of links, or sets retransmission of the undelivered data using a link in a data transmission waiting state. Further, the multi-link management unit 311 sets retransmission of the undelivered data using the retransmission link for retransmission of the undelivered data among the plurality of links.

The multi-link management unit 311 controls construction of a data frame (A-MPDU frame) in which the number of pieces of transmission data has been adjusted, or controls construction of a data frame obtained by combining the undelivered data and data to be newly transmitted, for at least one link used for data transmission. Further, although a configuration in which the multi-link management unit 311 controls the construction of data frames including the undelivered data according to a timing at which the reception acknowledgment information is received from the transmission destination of the data, and a transmission waiting situation of the data is adopted, other configurations may be adopted.

The multi-link management unit 311 presets a transmission opportunity (TXOP) longer than a duration of the data frame for a link that can be used for retransmission of undelivered data. Further, although a configuration in that, when second undelivered data is newly generated during transmission of the data frame including first undelivered data, the multi-link management unit 311 sets retransmission of the second undelivered data following the data frame is adopted, other configurations may be adopted.

On the other hand, when the communication device 200 operates as a reception side communication device, the access control unit 312 controls parallel reception of data using the plurality of links, and the multi-link management unit 311 sets the reception acknowledgment information including information capable of specifying the reception situation of the data in the other link when returning the reception acknowledgment information (ACK) on one link. The access control unit 312 controls the return of the reception acknowledgment information, and the multi-link management unit 311 sets reception of retransmission data corresponding to the reception acknowledgment information using one link.

The multi-link management unit 311 sets reception acknowledgment information including the sequence number of the undelivered data as the information capable of specifying the reception situation of the data in the other link.

A configuration in which the multi-link management unit 311 sets the retransmission link for reception of the retransmission data in addition to the link used for parallel reception of the data is adopted, but other configurations can be adopted.

A configuration in which the access control unit 312 controls the return of the reception acknowledgment information using a link that is accessible with respect to the transmission side communication device that is a transmission source of the data is adopted, but other configurations can be adopted.

The multi-link management unit 311 manages both the reception of the data using a predetermined link and the reception of the retransmission data. Specifically, the multi-link management unit 311 does not request the transmission of the retransmission data to the transmission source of the data (does not set the reception acknowledgment information including the sequence number of the undelivered data) while receiving a data frame including the retransmission data using the predetermined link.

Further, the multi-link management unit 311 determines whether it is necessary to output received data or determines whether or not to return the reception acknowledgment information, after the end of the received data frame (A-MPDU frame) is detected.

(3-6. Operation of Communication Device)

Hereinafter, an operation of the communication device 200 described above will be described.

(Operation at Time of Setup of Multi-Link Operation)

Figure 21:
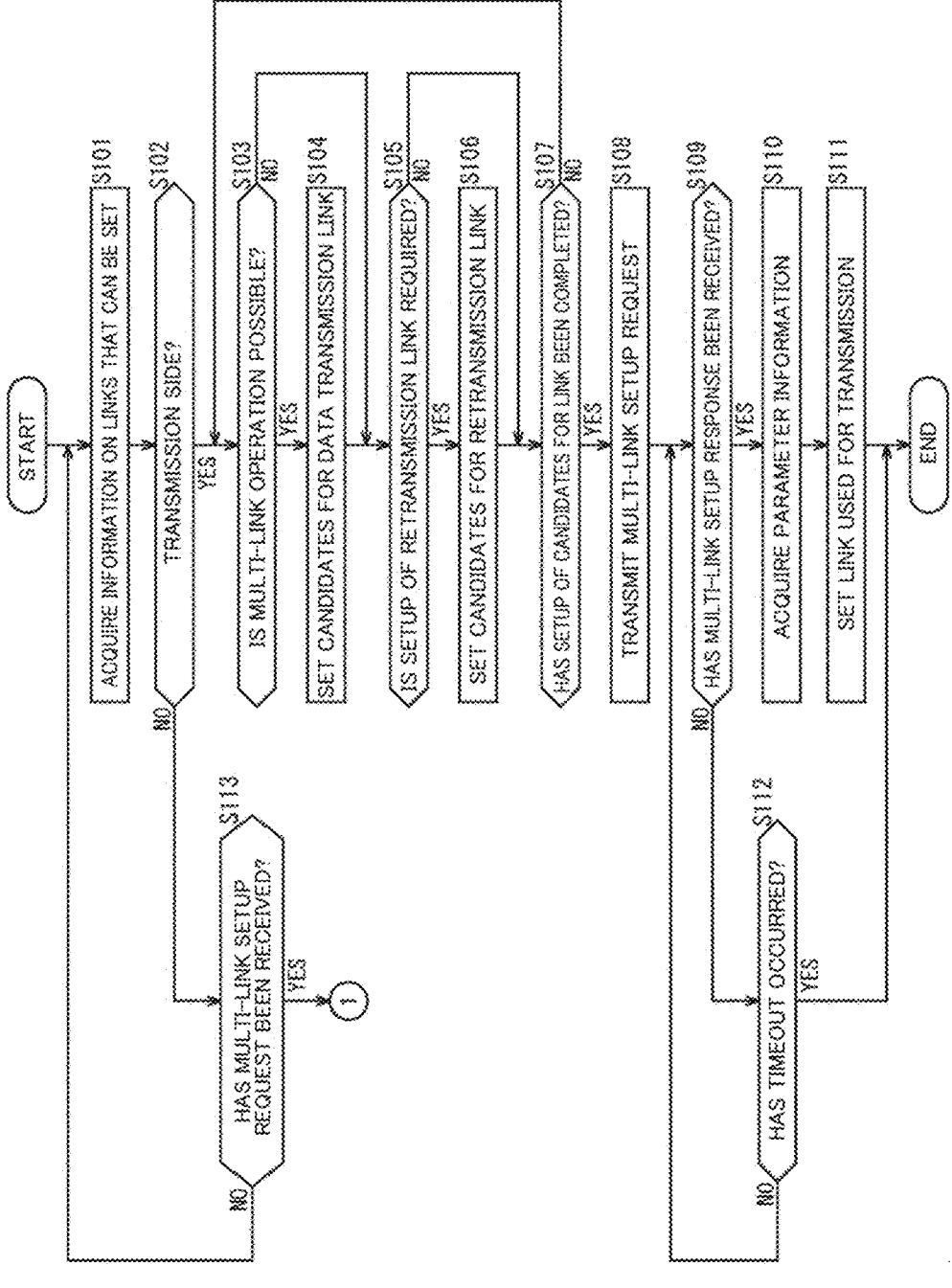
FIG. 21 is a flowchart illustrating a flow of an operation of the communication device at the time of setup of a multi-link operation.
Figure 22:
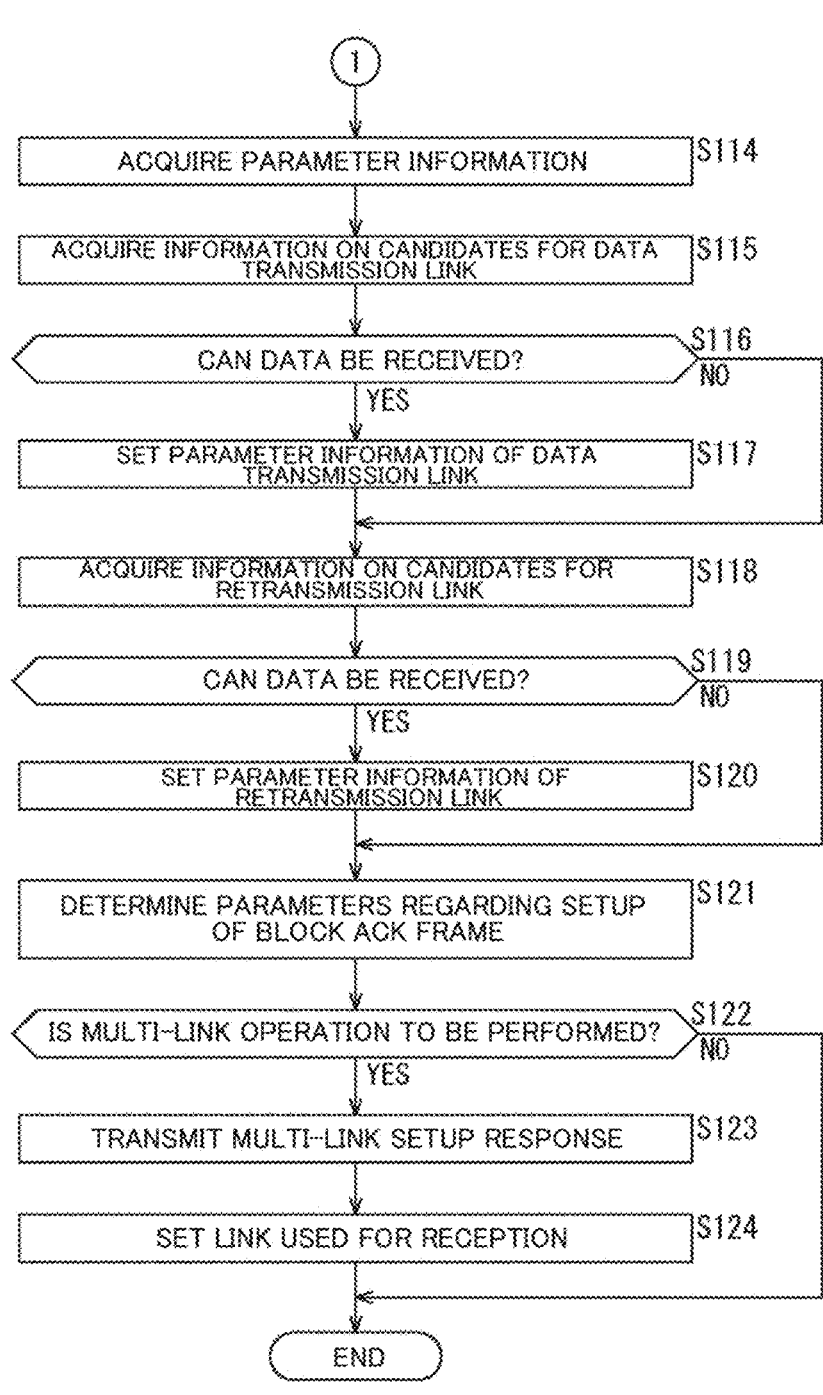
FIG. 22 is a flowchart illustrating a flow of an operation of the communication device at the time of setup of a multi-link operation.

First, a flow of an operation of the communication device 200 (the wireless communication module 250) at the time of setup of the multi-link operation will be described with reference to flowcharts of FIGS. 21 and 22.

In step S101, the multi-link management unit 311 acquires information on links that can be set in the multi-link operation.

In step S102, the multi-link management unit 311 determines whether or not the host device (the communication device 200) operates as a transmission side communication device, in other words, whether or not data transmission is possible. When a determination is made that the host device operates as the transmission side communication device, the processing proceeds to step S103.

In step S103, the multi-link management unit 311 determines whether the multi-link operation is possible in the host device (the communication device 200). When a determination is made that the multi-link operation is possible, the processing proceeds to step S104. On the other hand, when a determination is made that the multi-link operation is not possible, step S104 is skipped.

In step S104, the multi-link management unit 311 sets candidates for data transmission link that is a link for data transmission, from among links that can be set in the multi-link operation.

In step S105, the multi-link management unit 311 determines whether or not setup of the retransmission link for retransmission of the undelivered data is required. When a determination is made that the setup of the retransmission link is necessary, the processing proceeds to step S106. On the other hand, when a determination is made that the setup of the retransmission link is unnecessary, step S106 is skipped.

In step S106, the multi-link management unit 311 sets the candidates for the retransmission link from among the links that can be set in the multi-link operation.

In step S107, the multi-link management unit 311 determines whether or not the setup of candidates for the data transmission link and the candidates for the retransmission link has been completed. When a determination is made that the setup of candidates for each link has not been completed, the processing returns to step S103 and the subsequent processes are repeated. On the other hand, when a determination is made that the setup of the candidates for each link has been completed, the processing proceeds to step S108.

In step S108, the access control unit 312 controls the transmission processing unit 305 so that the multi-link setup request is transmitted to the other communication device 200 serving as a reception side communication device using one of the candidates for the set data transmission link. Parameter information regarding the candidates for each link, or the like is set in the multi-link setup request.

In step S109, the access control unit 312 controls the reception processing unit 307 to determine whether or not a multi-link setup response has been received from the reception side communication device. When a determination is made that the multi-link setup response has been received, the processing proceeds to step S110.

In step S110, the access control unit 312 acquires parameter information set in the multi-link setup response received by the reception processing unit 307 via the reception frame analysis unit 308.

In step S111, the multi-link management unit 311 sets a link used for data transmission (the data transmission link and the retransmission link) on the basis of the parameter information acquired by the access control unit 312, and the operation at the time of the setup is completed.

Thus, the multi-link management unit 311 of the transmission side communication device sets up a link to be used in the multi-link operation through negotiation with the reception side communication device.

On the other hand, when a determination is made in step S109 that the multi-link setup response has not been received, the processing proceeds to step S112.

In step S112, a determination is made as to whether or not a timeout has occurred depending on whether or not a preset time has elapsed since the multi-link setup request is transmitted. When a determination is made that the preset time has not elapsed and the timeout has not occurred, the processing returns to step S109 and waits for reception of the multi-link setup response. On the other hand, when a determination is made that the preset time has elapsed and the timeout has occurred, the processing ends without completion of the operation at the time of the setup.

Now, when a determination is made in step S102 that the host device does not operate as the transmission side communication device, that is, when the host device operates as the reception side communication device, the processing proceeds to step S113.

In step S113, the access control unit 312 controls the reception processing unit 307 to determine whether or not the multi-link setup request has been received from the transmission side communication device. When a determination is made that the multi-link setup request has not been received, the processing returns to step S101. On the other hand, when a determination is made that the multi-link setup request has been received, the processing proceeds to step S114 (FIG. 22).

In step S114, the access control unit 312 acquires parameter information set in the multi-link setup request received by the reception processing unit 307 via the reception frame analysis unit 308.

In step S115, the multi-link management unit 311 acquires information on the candidates for the data transmission link set by the transmission side communication device from the parameter information acquired by the access control unit 312.

In step S116, the multi-link management unit 311 determines whether or not the data can be received in candidate for the data transmission link set by the transmission side communication device. Here, it is assumed that the candidate for the data transmission link is a link that can be set in the multi-link operation, on which the information has been acquired in step S101.

When a determination is made that the data can be received, the processing proceeds to step S117. On the other hand, when a determination is made that the data cannot be received, step S117 is skipped.

In step S117, the multi-link management unit 311 sets parameter information regarding data reception required for the link, on the basis of a capacity of the reception buffer 310 or the use situation of the link, for the candidates for the data transmission link determined to be able to receive data.

In step S118, the multi-link management unit 311 acquires information on the candidates for the retransmission link set by the transmission side communication device from the parameter information acquired by the access control unit 312.

In step S119, the multi-link management unit 311 determines whether or not data can be received in the candidate for the retransmission link set by the transmission side communication device. Here, it is also assumed that the candidate for the retransmission link is a link that can be set in the multi-link operation, on which information has been acquired in step S101.

When a determination is made that data can be received, the processing proceeds to step S120. On the other hand, when a determination is made that the data cannot be received, step S120 is skipped.

In step S120, the multi-link management unit 311 sets parameter information regarding data reception required for the link, on the basis of the capacity of the reception buffer 310 or the use situation of the link, for the candidates for the data transmission link determined to be able to receive data.

In step S121, the multi-link management unit 311 determines parameters regarding setup of the block ACK frame, such as a method of writing the block ACK information. That is, parameters for a configuration of the reception acknowledgment information (ACK) and retransmission of the data in the multi-link operation are set.

In step S122, the multi-link management unit 311 determines whether or not the multi-link operation is to be performed. When a determination is made that the multi-link operation is to be performed, the processing proceeds to step S123.

In step S123, the access control unit 312 controls the transmission processing unit 305 to transmit the multi-link setup response to the other communication device 200 serving as the transmission side communication device using the link on which the multi-link setup request has been received. Parameter information regarding each candidate for the link, or the like is set in the multi-link setup response.

In step S124, the multi-link management unit 311 sets the link (the data transmission link and the retransmission link) used for data reception on the basis of the parameter information set by the access control unit 312, and the operation at the time of setup is completed.

Thus, the multi-link management unit 311 of the reception side communication device sets the link to be used in the multi-link operation through negotiation with the transmission side communication device.

(Operation of Transmission Side Communication Device)

Figure 23:
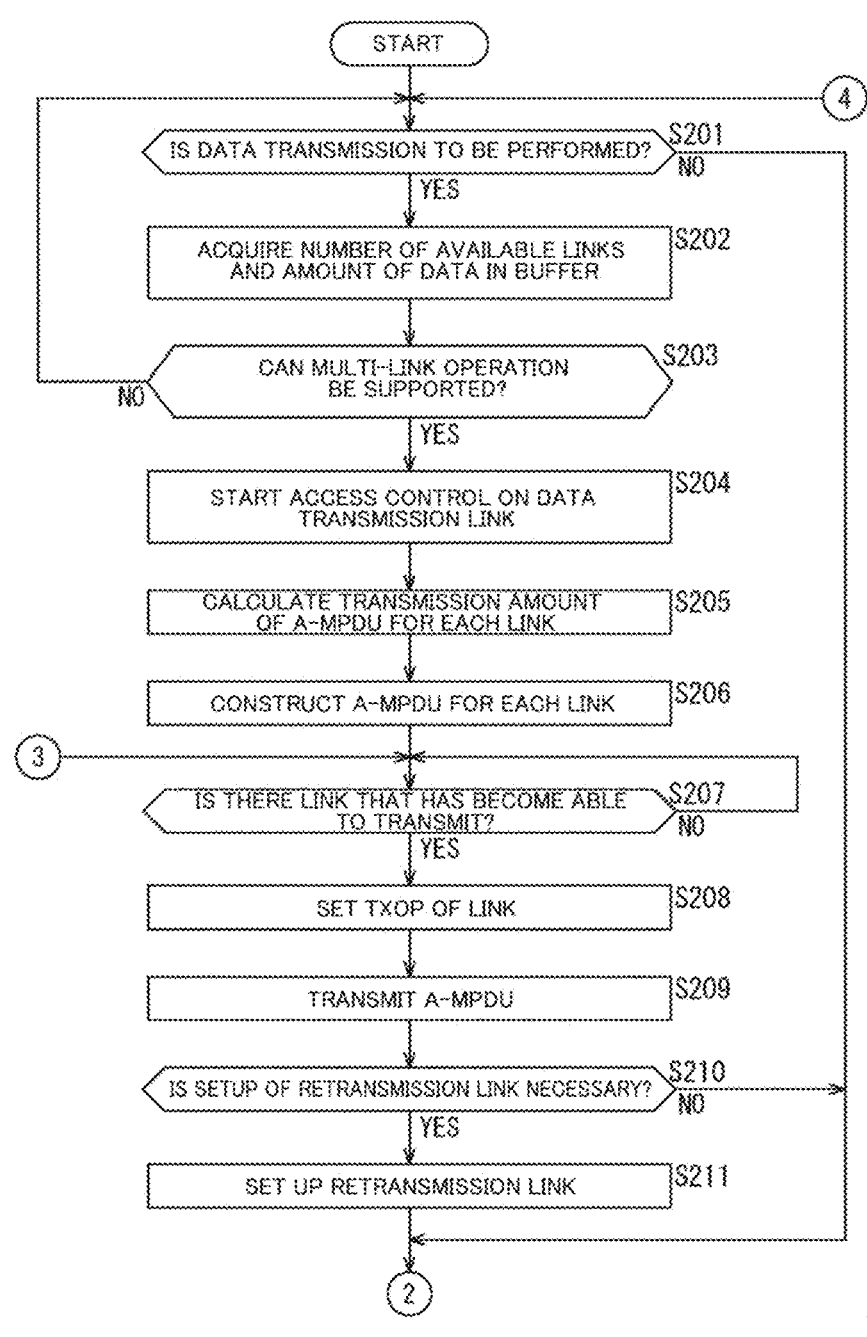
FIG. 23 is a flowchart illustrating a flow of an operation of a transmission side communication device.

A flow of the operation of the communication device 200 (the wireless communication module 250) as the transmission side communication device will be described with reference to flowcharts of FIGS. 23 and 24.

In step S201, the multi-link management unit 311 determines whether or not data transmission is to be performed. When a determination is made that the data transmission is to be performed, the processing proceeds to step S202.

In step S202, the multi-link management unit 311 acquires the number of links available for data transmission and an amount of data present in the transmission buffer 302.

In step S203, the multi-link management unit 311 determines whether or not the multi-link operation can be supported on the basis of the number of available links and the amount of data in the transmission buffer 302 that have been acquired. When a determination is made that the multi-link operation cannot be supported, the processing returns to step S201. On the other hand, when a determination is made that the multi-link operation can be supported, the processing proceeds to step S204.

In step S204, the access control unit 312 starts access control on the data transmission link by controlling the transmission processing unit 305.

In step S205, the multi-link management unit 311 calculates a transmission amount of the A-MPDU frames for each link.

In step S206, the multi-link management unit 311 causes the transmission frame construction unit 304 to construct the A-MPDU frame for each link on the basis of an amount of transmission of the A-MPDU frames calculated for each link. Here, the optimal number of MPDUs (the number of transmission pieces of data) is determined on the basis of the setup of a transmission waiting time of each link, a degree of congestion of each link, and the like. The number of MPDUs estimated to be most efficient when all the links are used is adjusted for each link.

In step S207, the access control unit 312 performs countdown until the transmission waiting time of each link to determine whether or not there is a link that has become able to transmit. Step S207 is repeated until a determination is made that there is a link that has become able to transmit. When a determination is made that there is a link that has become able to transmit, the processing proceeds to step S208.

In step S208, the access control unit 312 sets a transmission opportunity (TXOP) of the link that has become able to transmit as a duration. For example, a TXOP longer than the duration of the data frame is set. Here, a time when retransmission of the undelivered data is expected may be set in the TXOP.

In step S209, the access control unit 312 causes the transmission processing unit 305 to transmit the A-MPDU frame constructed within a range of the set TXOP.

In step S210, the multi-link management unit 311 determines whether or not the setup of the retransmission link is necessary. When a determination is made that the setup of the retransmission link is necessary, the processing proceeds to step S211, and the multi-link management unit 311 sets up the retransmission link. Here, a setup of the retransmission link is settled so that the link set as the retransmission link at the time of setup of the multi-link operation is not used unexpectedly at the time of start of access control or in a free link state.

Figure 24:
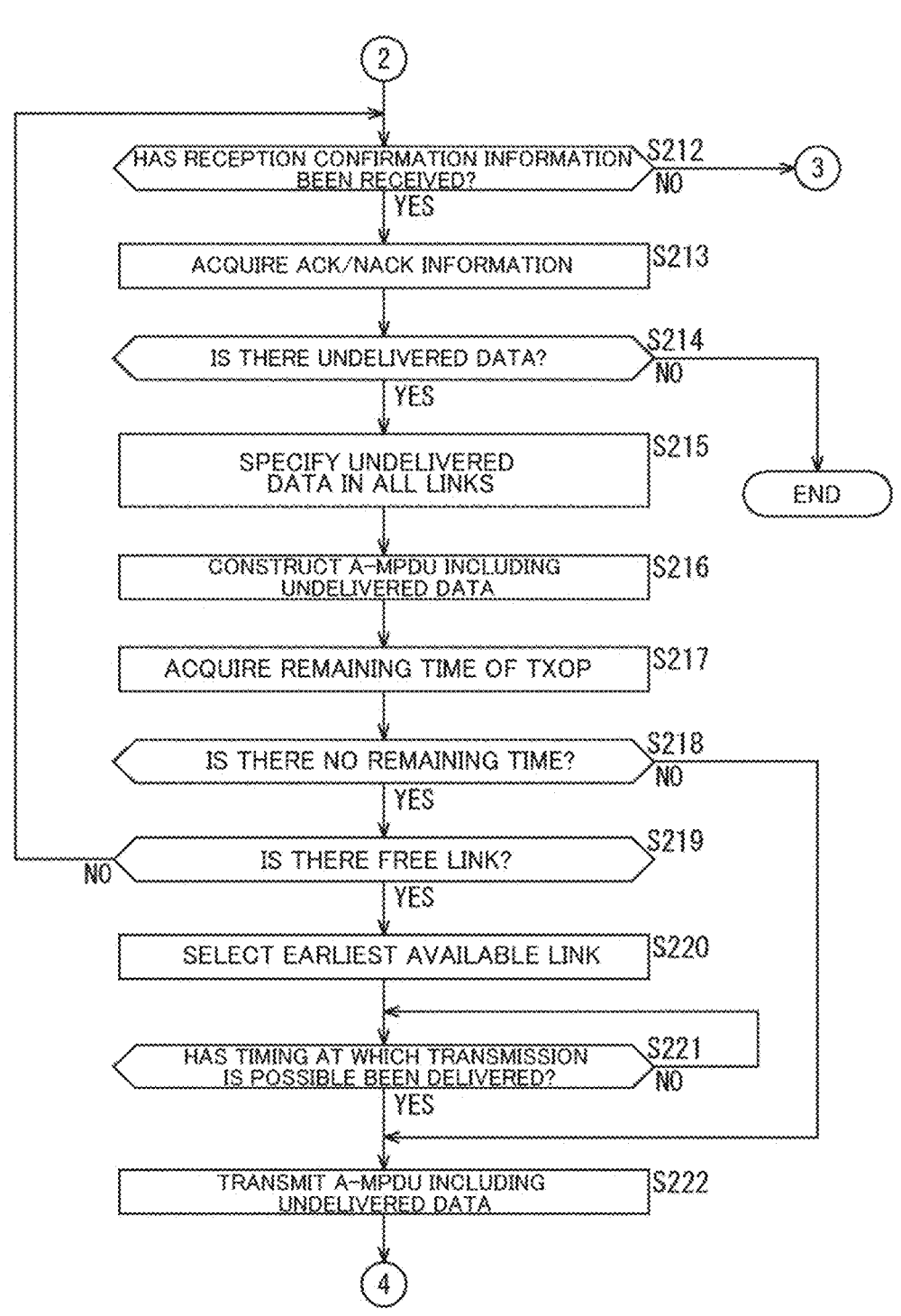
FIG. 24 is a flowchart illustrating a flow of an operation of the transmission side communication device.

On the other hand, when a determination is made that the setup of the retransmission link is not necessary, step S211 is skipped and the processing proceeds to step S212 (FIG. 24). Further, when a determination is made in step S201 that data transmission is not to be performed, steps S202 to S211 are skipped and the processing proceeds to step S212 (FIG. 24).

In step S212, the access control unit 312 controls the reception processing unit 307 to determine whether or not the reception acknowledgment information has been received from the reception side communication device. When a determination is made that the reception acknowledgment information (ACK) has not been received, the processing returns to step S207 (FIG. 23), and the transmission of the A-MPDU frame on the other link is repeated.

On the other hand, when a determination is made that the reception acknowledgment information has been received in the predetermined link, the processing proceeds to step S213.

In step S213, the access control unit 312 acquires ACK information (NACK information) set in the reception acknowledgment information received by the reception processing unit 307 via the reception frame analysis unit 308.

In step S214, the multi-link management unit 311 determines whether or not there is undelivered data that needs to be retransmitted to the reception side communication device, on the basis of the ACK information (NACK information) acquired by the access control unit 312.

When a determination is made that there is no undelivered data, that is, when transmission of all pieces of data has been completed, the processing ends. On the other hand, when a determination is made that there is the undelivered data, the processing proceeds to step S215.

In step S215, the multi-link management unit 311 specifies the undelivered data in all the links. Here, the undelivered data is specified by determining a decoding situation of data that has been transmitted in each link from the block ACK information included in the reception acknowledgment information.

In step S216, the multi-link management unit 311 causes the transmission frame construction unit 304 to construct an A-MPDU frame including the specified undelivered data. Thus, the A-MPDU frame is constructed according to a timing at which the reception acknowledgment information is received from the reception side communication device serving as a data transmission destination and the transmission waiting situation of the data. The A-MPDU frame constructed here may be configured of a combination of the undelivered data and newly transmitted data, or may be configured of only the undelivered data.

In step S217, the access control unit 312 acquires a remaining time of the TXOP of the link that has ended the transmission of the data (the link that has received the reception acknowledgment information).

In step S218, the access control unit 312 determines whether or not there is no acquired remaining time of the TXOP. When a determination is made that there is no remaining time, the processing proceeds to step S219.

In step S219, the multi-link management unit 311 determines whether or not there is a free link that has entered the transmission waiting state. When a determination is made that there is a free link, the processing proceeds to step S220 and the multi-link management unit 311 selects an earliest free link among the available links. Here, a link in the transmission waiting state may be selected or the retransmission link may be selected as the earliest available link.

On the other hand, when a determination is made that there is no free link, the processing returns to step S212 and waits for reception of the next reception acknowledgment information (ACK).

After the earliest available link is selected, the access control unit 312 determines whether or not a timing at which transmission is possible has been delivered in the selected link in step S221. Step S221 is repeated until a determination is made that the timing at which transmission is possible has been delivered. When a determination is made that timing at which transmission is possible has been delivered, the processing proceeds to step S222. Further, when a determination is made in step S208 that there is the remaining time, steps S219 to S221 are skipped and the processing proceeds to step S222.

In step S222, the access control unit 312 causes the transmission processing unit 305 to transmit the A-MPDU frame including the undelivered data using the link determined to have remaining time or a first available free link. Thereafter, the processing returns to step S201.

Thus, the above-described processing is repeated until all pieces of data including undelivered data is transmitted using all links set in the multi-link operation.
(Operation of Reception Side Communication Device)

Figure 25:
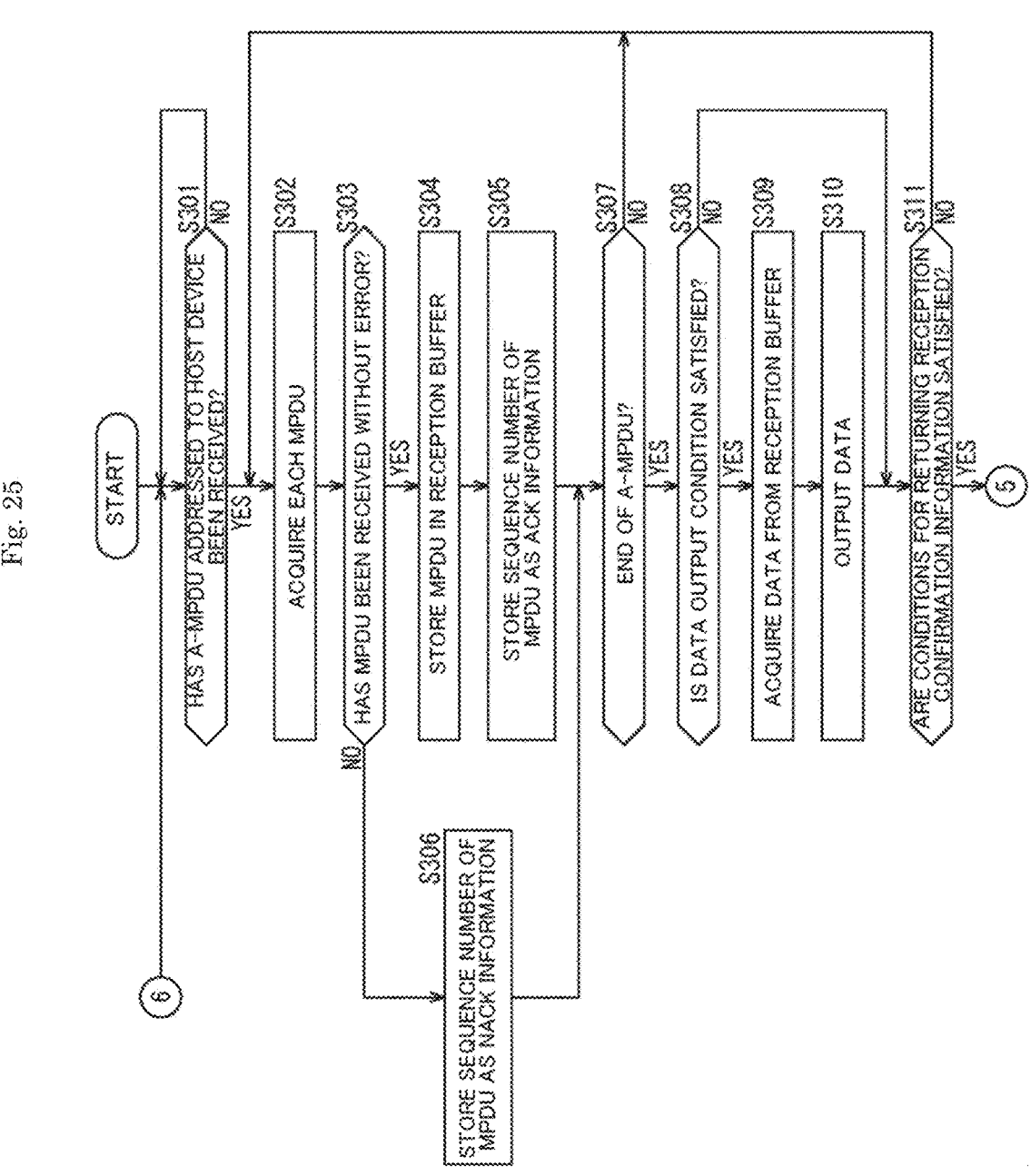
FIG. 25 is a flowchart illustrating a flow of operation of a reception side communication device.
Figure 26:
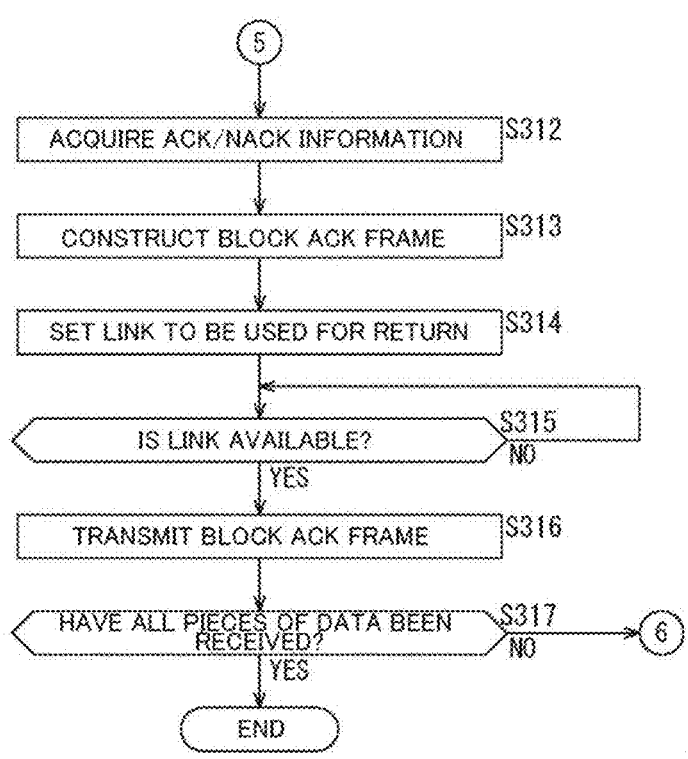
FIG. 26 is a flowchart illustrating a flow of an operation of the reception side communication device.

A flow of an operation of the communication device 200 (the wireless communication module 250) as the reception side communication device will be described with reference to flowcharts of FIGS. 25 and 26. Processing in FIGS. 25 and 26 shows a flow of an operation for one of a plurality of links, but in the multi-link operation, this processing is executed in parallel for the plurality of links.

In step S301, the access control unit 312 determines whether or not an A-MPDU frame addressed to the host device has been received through the reception frame analysis unit 308. Step S301 is repeated until a determination is made that the A-MPDU frame addressed to the host device has been received. When a determination is made that the A-MPDU frame addressed to the host device has been received, the processing proceeds to step S302.

In step S302, the multi-link management unit 311 causes the reception frame analysis unit 308 to acquire each MPDU on the basis of the length included in the delimiter of the A-MPDU Subframes constituting the received A-MPDU frame.

In step S303, the multi-link management unit 311 controls the reception sequence management unit 309 to determine whether or not the MPDU acquired by the reception frame analysis unit 308 has been received without error. When a determination is made that the data has been received without error, the processing proceeds to step S304.

In step S304, the multi-link management unit 311 controls the reception sequence management unit 309 so that MPDUs determined to have been received without error are stored in the reception buffer 310.

In step S305, the multi-link management unit 311 stores the sequence number of the MPDU stored in the reception buffer 310 as ACK information in a storage area (not illustrated).

On the other hand, when a determination is made in step S303 that the MPDU could not be received without error, that is, when there is an error in the received MPDU, the processing proceeds to step S306.

In step S306, the multi-link management unit 311 stores the sequence number of the erroneous MPDU as NACK information in a storage area (not illustrated).

After the sequence number of the MPDU is stored as the ACK information or NACK information, the multi-link management unit 311 determines whether the received MPDU is the end of the A-MPDU frame in step S307. When a determination is made the received MPDU is not the end of the A-MPDU frame, the processing returns to step S302 and the subsequent processes are repeated. On the other hand, when a determination is made the received MPDU is the end of the A-MPDU frame, the processing proceeds to step S308.

In step S308, the multi-link management unit 311 determines whether or not a data output condition, such as whether or not an output timing of the data stored in the reception buffer 310 has been delivered, is satisfied. When a determination is made that the data output condition is satisfied, the processing proceeds to step S309.

In step S309, the multi-link management unit 311 controls the I/F 301 so that the I/F 301 acquires data from the reception buffer 310.

In step S310, the multi-link management unit 311 causes the data acquired from the reception buffer 310 to be output from the I/F 301. The output data is supplied to an application that is executed by the device control module 230.

On the other hand, when a determination is made in step S308 that the data output condition is not satisfied, steps S309 and S310 are skipped.

In step S311, the multi-link management unit 311 determines whether or not conditions for returning reception acknowledgment information are satisfied. Here, a determination is made as to whether or not the conditions for returning reception acknowledgment information are satisfied, depending on whether or not the reception acknowledgment information needs to be returned or whether or not there is undelivered data required to be retransmitted.

A determination is made that the conditions for returning reception acknowledgment information are not satisfied, for example, while the A-MPDU frame including the retransmitted undelivered data is being received using the predetermined link.

When a determination is made that the conditions for returning reception acknowledgment information are not satisfied, the processing returns to step S302 and the subsequent processing is repeated. On the other hand, when a determination is made that the conditions for returning reception acknowledgment information are satisfied, the processing proceeds to step S312 (FIG. 26).

In step S312, the multi-link management unit 311 acquires ACK information or NACK information stored in a storage area (not illustrated).

Here, ACK information (NACK information) including not only the ACK information (NACK information) for the data in one link, but also the reception situation of the data in all other links is acquired.

In step S313, the multi-link management unit 311 causes the transmission frame construction unit 304 to construct the block ACK frame having the acquired ACK information or NACK information described therein, on the basis of a preset data format.

For example, when the block ACK frame described with reference to FIG. 16 or 17 is constructed, information that can specify the latest sequence number of the data received on each link is added to the block ACK frame. When the block ACK frame described with reference to FIG. 18 is constructed, NACK information including the sequence number of the undelivered data required to be retransmitted is written in the block ACK frame.

In step S314, the multi-link management unit 311 sets a link to be used for return of the constructed block ACK frame. The link used for return of the block ACK frame may be the link used to receive the A-MPDU frame, or may be a return link set as a reverse link in the multi-link setup response.

In step S315, the access control unit 312 determines whether or not the set link is available. Step S315 is repeated until a determination is made that the set link becomes available. When a determination is made that the set link has become available, the processing proceeds to step S316.

In step S316, the access control unit 312 causes the transmission processing unit 305 to transmit the block ACK frame using the link that has become available.

Thereafter, in step S317, the multi-link management unit 311 determines whether or not all the pieces of data (MPDU) have been received, on the basis of the MPDU sequence numbers managed by the reception sequence management unit 309.

When a determination is made that all the pieces of data have not been received, the processing returns to step S301, and subsequent processing is executed for the A-MPDU frame including the undelivered data to be retransmitted. On the other hand, when a determination is made that all pieces of data have been received, the processing ends.

According to the above processing, even when undelivered data is generated in the multi-link operation using a plurality of links, the undelivered data is retransmitted using available links, making it possible to realize more suitable retransmission of the undelivered data.

4. Conclusion

According to the technology according to the present disclosure, since undelivered data is retransmitted using a link other than the link used for transmission of the data, it is possible to realize retransmission of the undelivered data using a minimum number of necessary links while transmitting new data.

Specifically, when the transmission side communication device transmits data using a plurality of links, the undelivered data is retransmitted using a link on which data transmission has early ended, makes it possible to transmit all pieces of data in a shorter time. Alternatively, when the transmission side communication device transmits the data using the plurality of links, undelivered data is retransmitted using a link that has not yet been used for data transmission or a link that becomes available at a latest timing, making it possible to efficiently transmit data in a shorter period of time.

Further, since the A-MPDU frame having a short frame length is configured according to the frame aggregation as necessary, the transmission side communication device can receive the reception acknowledgment information (ACK) in a shorter period of time.

Further, since backoff of random access control is executed in another link during transmission of data using a certain link, the transmission side communication device can efficiently retransmit erroneous undelivered data immediately after the occurrence of a reception error is detected in the reception side communication device.

Further, when data is transmitted using a certain link, a large number of transmission opportunities (TXOP) are secured, and the duration includes spare time, and therefore, a timing at which undelivered data is retransmitted using that link is secured in advance. That is, the retransmission is completed within the duration, making it possible to reduce the backoff time, and for the transmission side communication device to efficiently transmit data of an application such as real-time application (RTA).

Further, according to the technology according to the present disclosure, when data is received using a plurality of links, the information that can specify the latest sequence number of the data received on each link is written in the block ACK frame, so that the reception side communication device can more reliably notify the transmission side communication device of the sequence number of the undelivered data.

Further, when data is received using a plurality of links, the block ACK frame having the NACK information written therein is returned, so that the reception side communication device can notify the transmission side communication device of the sequence number of erroneous data among the undelivered data. When the sequence number of the erroneous data is clarified, it is possible to prevent data that has not been transmitted or data that has not been decoded, which is not expressed with information of a bitmap format of the related art, from being repeatedly transmitted.

The effects described herein are merely examples and are not limited, and there may be other effects.

Further, the embodiments to which the technology according to the present disclosure is applied are not limited to the above-described embodiments, and various changes can be made without departing from the gist of the technology according to the present disclosure.

Further, the present disclosure can be configured as follows.

(1) A communication device including:

an access control unit configured to control parallel transmission of data using a plurality of links in a wireless network; and a multi-link management unit configured to set retransmission of undelivered data using an available one of the links when the undelivered data is generated on a predetermined one of the links.

(2) The communication device according to (1), wherein the multi-link management unit specifies the undelivered data that needs to be retransmitted on the basis of reception acknowledgment information from a transmission destination of the data.

(3) The communication device according to (1) or (2), wherein the multi-link management unit sets retransmission of the undelivered data using the link on which transmission of the data has ended among the plurality of links.

(4) The communication device according to (1) or (2), wherein the multi-link management unit sets retransmission of the undelivered data using the link in a transmission waiting state of the data among the plurality of links.

(5) The communication device according to (1) or (2), wherein the multi-link management unit sets retransmission of the undelivered data using a retransmission link for retransmission of the undelivered data among the plurality of links.

(6) The communication device according to any one of (1) to (5), wherein the multi-link management unit controls construction of a data frame with the adjusted number of pieces of transmission data for at least one of the links used for transmission of the data.

(7) The communication device according to any one of (1) to (5), wherein the multi-link management unit controls construction of a data frame obtained by combining the undelivered data and newly transmitted data, for at least one of the links used for transmission of the data.

(8) The communication device according to any one of (1) to (7), wherein the multi-link management unit controls construction of a data frame including the undelivered data according to a timing at which the reception acknowledgment information is received from the transmission destination of the data, and a transmission waiting situation of the data.

(9) The communication device according to any one of (1) to (8), wherein the multi-link management unit presets a transmission opportunity longer than a duration of the data frame for the link that can be used for retransmission of the undelivered data.

(10) The communication device according to any one of (1) to (9), wherein when second undelivered data newly occurs during the transmission of the data frame including the first undelivered data, the multi-link management unit sets the retransmission of the second undelivered data following the data frame.

(11) A communication method including:

controlling, by a communication device, parallel transmission of data using a plurality of links in a wireless network; and setting, by the communication device, retransmission of the undelivered data using an available one of the links when the undelivered data is generated on a predetermined one of the links.

(12) A communication device including:

an access control unit configured to control parallel reception of data using a plurality of links in a wireless network; and a multi-link management unit configured to set reception acknowledgment information including information capable of specifying a reception situation of the data on another one of the links when the reception acknowledgment information is returned on one of the links, wherein the access control unit controls return of the reception acknowledgment information, and the multi-link management unit sets reception of retransmission data corresponding to the reception acknowledgment information using the one link.

(13) The communication device according to (12), wherein the multi-link management unit sets the reception acknowledgment information including a sequence number of the undelivered data as the information capable of specifying the reception situation of the data on the other link.

(14) The communication device according to (12) or (13), wherein the multi-link management unit sets a retransmission link for reception of the retransmission data, in addition to the links used for parallel reception of the data.

(15) The communication device according to any one of (12) to (14), wherein the access control unit controls the return of the reception acknowledgment information using the link accessible with respect to a transmission source of the data.

(16) The communication device according to any one of (12) to (15), wherein the multi-link management unit manages both reception of the data using the predetermined link and reception of the retransmission data.

(17) The communication device according to any one of (12) to (16), wherein the multi-link management unit does not request transmission of the retransmission data to a transmission source of the data while receiving a data frame including the retransmission data using the predetermined link.

(18) The communication device according to any one of (12) to (17), wherein the multi-link management unit determines whether or not the received data is required to be output after an end of the received data frame is detected.

(19) The communication device according to any one of (12) to (18), wherein the multi-link management unit determines whether or not return of the reception acknowledgment information is required after an end of the received data frame is detected.

(20) A communication method including:

controlling, by a communication device, parallel reception of data using a plurality of links in a wireless network; and setting, by the communication device, reception acknowledgment information including information capable of specifying a reception situation of the data on another one of the links when the reception acknowledgment information is returned on one of the links;

controlling, by the communication device, the return of the reception acknowledgment information; and setting, by the communication device, the link to receive the retransmission data.

REFERENCE SIGNS LIST

200 Communication device
250 Wireless communication module
301 I/F
302 Transmission buffer
303 Transmission sequence management unit
304 Transmission frame construction unit
305 Transmission processing unit
306 Transmission and reception antenna
307 Reception processing unit
308 Reception frame analysis unit
309 Reception sequence management unit
310 Reception buffer
311 Multi-link management unit
312 Access control unit

The invention claimed is:

1. A communication device comprising:

circuitry configured to:

control parallel transmission of data having a plurality of sequence numbers using a plurality of links in a wireless network;

determine a sequence number of undelivered data that needs to be retransmitted on the basis of reception acknowledgment information received on a first link of the plurality of links from a transmission destination of the data, the reception acknowledgment information being representative of the sequence number of the undelivered data and the reception acknowledgment information specifying, on a sequence number basis, a reception situation of data on at least one link other than the first link; and control retransmission of the undelivered data.

2. The communication device according to claim 1, wherein the circuitry is configured to control the retransmission of the undelivered data using a link of the plurality of links on which transmission of the data has ended among the plurality of links.

3. The communication device according to claim 1, wherein the circuitry is configured to control the retransmission of the undelivered data using a link of the plurality of links in a transmission waiting state of the data among the plurality of links.

4. The communication device according to claim 1, wherein the circuitry is configured to control the retransmission of the undelivered data using a retransmission link for retransmission of the undelivered data among the plurality of links.

5. The communication device according to claim 1, wherein the circuitry is configured to control construction of a data frame with an adjusted number of pieces of transmission data for at least one of the plurality of links used for transmission of the data.

6. The communication device according to claim 1, wherein the circuitry is configured to control construction of a data frame obtained by combining the undelivered data and newly transmitted data for at least one of the plurality of links used for transmission of the data.

7. The communication device according to claim 1, wherein the circuitry is configured to control construction of a data frame including the undelivered data according to a timing at which the reception acknowledgment information is received from the transmission destination of the data and a transmission waiting situation of the data.

8. The communication device according to claim 1, wherein the circuitry is configured to preset a transmission opportunity longer than a duration of a data frame for a link of the plurality of links that can be used for retransmission of the undelivered data.

9. The communication device according to claim 1, wherein, when second undelivered data newly occurs during transmission of a data frame including the undelivered data, the circuitry is configured to set the retransmission of the second undelivered data following the data frame.

10. The communication device according to claim 1, wherein the reception acknowledgment information includes a bitmap configured with an information length longer than an information length of any of IEEE 802.11a, IEEE 802.11n, IEEE 802.11ac, IEEE 802.11b, and IEEE 802.11g.

11. A communication method comprising:

controlling, by a communication device, parallel transmission of data having a plurality of sequence numbers using a plurality of links in a wireless network;

determining, by the communication device, undelivered data that needs to be retransmitted on the basis of reception acknowledgment information received on a first link of the plurality of links from a transmission destination of the data, the reception acknowledgment information being representative of the sequence number of the undelivered data and the reception acknowledgment information specifying, on a sequence number basis, a reception situation of data on at least one link other than the first link; and controlling, by the communication device, retransmission of the undelivered data.

12. A communication device comprising:

circuitry configured to:

control parallel reception of data having a plurality of sequence numbers using a plurality of links in a wireless network;

set reception acknowledgment information including information capable of specifying, on a sequence number basis, a reception situation of the data;

control return of the reception acknowledgment information on a first link of the plurality of links, the information of the reception acknowledgment information being representative of a sequence number of undelivered data and being capable of specifying the reception situation of the data on at least one link other than the first link; and control reception of retransmission data corresponding to the reception acknowledgment information using one of the plurality of links.

13. The communication device according to claim 12, wherein the circuitry is configured to set the reception acknowledgment information including a sequence number of the undelivered data as the information capable of specifying the reception situation of the data on the at least one link other than the first link.

14. The communication device according to claim 12, wherein the circuitry is configured to set a retransmission link for reception of the retransmission data in addition to the plurality of links used for parallel reception of the data.

15. The communication device according to claim 12, wherein the circuitry is configured to control the return of the reception acknowledgment information using a link of the plurality of links accessible with respect to a transmission source of the data.

16. The communication device according to claim 12, wherein the circuitry is configured to manage both reception of the data using a predetermined link of the plurality of links and reception of the retransmission data.

17. The communication device according to claim 16, wherein the circuitry is configured to not request transmission of the retransmission data to a transmission source of the data while receiving a data frame including the retransmission data using the predetermined link.

18. The communication device according to claim 12, wherein the circuitry is configured to determine whether or not the received data is required to be output after an end of a received data frame is detected.

19. The communication device according to claim 12, wherein the circuitry is configured to determine whether or not return of the reception acknowledgment information is required after an end of a received data frame is detected.

20. A communication method comprising:

controlling, by a communication device, parallel reception of data having a plurality of sequence numbers using a plurality of links in a wireless network;

setting, by the communication device, reception acknowledgment information including information capable of specifying, on a sequence number basis, a reception situation of the data;

controlling, by the communication device, return of the reception acknowledgment information on a first link of the plurality of links, the information of the reception acknowledgment information being representative of a sequence number of undelivered data and being capable of specifying the reception situation of the data on at least one link other than the first link; and controlling, by the communication device, one of the plurality of links to receive retransmission data.

* * * * *